United States Patent [19]
Ohtsubo et al.

[11] Patent Number: 5,189,521
[45] Date of Patent: Feb. 23, 1993

[54] IMAGE FORMING APPARATUS AND METHOD FOR CORRECTION IMAGE DENSITY NON-UNIFORMITY BY READING A TEST PATTERN RECORDED BY THE APPARATUS

[75] Inventors: Toshihiko Ohtsubo, Yokohama; Seita Shouno, Warabi; Akio Suzuki, Yokohama; Kiyohisa Sugishima, Yokohama; Eiichi Takagi, Yokohama; Yoshihiro Takada, Kawasaki, all of Japan

[73] Assignee: Canon Kabushiki Kaisha, Tokyo, Japan

[21] Appl. No.: 711,648

[22] Filed: Jun. 6, 1991

[30] Foreign Application Priority Data
Jun. 11, 1990 [JP] Japan ................... 2-152150

[51] Int. Cl.⁵ ............ H04N 1/21; H04N 1/40; G03G 21/00
[52] U.S. Cl. .................... 358/296; 358/80; 355/246
[58] Field of Search ........... 358/80, 296; 346/1.1, 346/140 R; 355/214, 246

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 1/1984 | Sato et al. . |
| 4,463,359 | 7/1984 | Ayata et al. . |
| 4,519,695 | 5/1985 | Murai . |
| 4,551,005 | 11/1985 | Koichi . |
| 4,558,333 | 12/1985 | Sugitani et al. . |
| 4,675,696 | 6/1987 | Suzuki ............... 358/296 X |
| 4,723,129 | 2/1988 | Endo et al. . |
| 4,740,796 | 4/1988 | Endo et al. . |
| 4,776,023 | 10/1988 | Hamada et al. . |
| 4,827,279 | 5/1989 | Lubinsky et al. ........... 346/1.1 |
| 4,831,420 | 5/1989 | Walsh et al. . |
| 4,894,685 | 1/1990 | Shoji ............... 355/246 |
| 4,929,978 | 5/1990 | Kanamori et al. ........... 358/80 X |
| 4,977,459 | 12/1990 | Ebinuma et al. ........... 358/296 |
| 5,038,208 | 8/1991 | Ichikawa et al. ........... 358/80 X |

FOREIGN PATENT DOCUMENTS

| | | |
|---|---|---|
| 398502 | 11/1990 | European Pat. Off. . |
| 59-123670 | 7/1984 | Japan . |
| 59-138461 | 8/1984 | Japan . |
| 63-129769 | 6/1988 | Japan . |
| 3-028859 | 2/1991 | Japan . |

Primary Examiner—Benjamin R. Fuller
Assistant Examiner—Eric Frahm
Attorney, Agent, or Firm—Fitzpatrick, Cella, Harper & Scinto

[57] ABSTRACT

There is disclosed an image forming apparatus for recording an original image read by a reading unit on a recording medium uses a recording head having an array of a plurality of recording elements. The apparatus includes pattern forming unit for forming, on the recording medium, a test pattern having an area larger than an array range of the plurality of recording elements using the recording head in accordance with a predetermined operation, a detection unit for causing the reading unit to read the test pattern formed on the recording medium by the pattern forming unit in accordance with a predetermined operation, and detecting a density distribution within the array range of the plurality of recording elements, a generation unit for generating correction data of a drive condition for uniforming a density during image formation on the basis of the density distribution detected by the detection unit in correspondence with the plurality of recording elements, and a guide unit for display the predetermined operations on a display unit.

31 Claims, 26 Drawing Sheets

TO NEXT COLOR

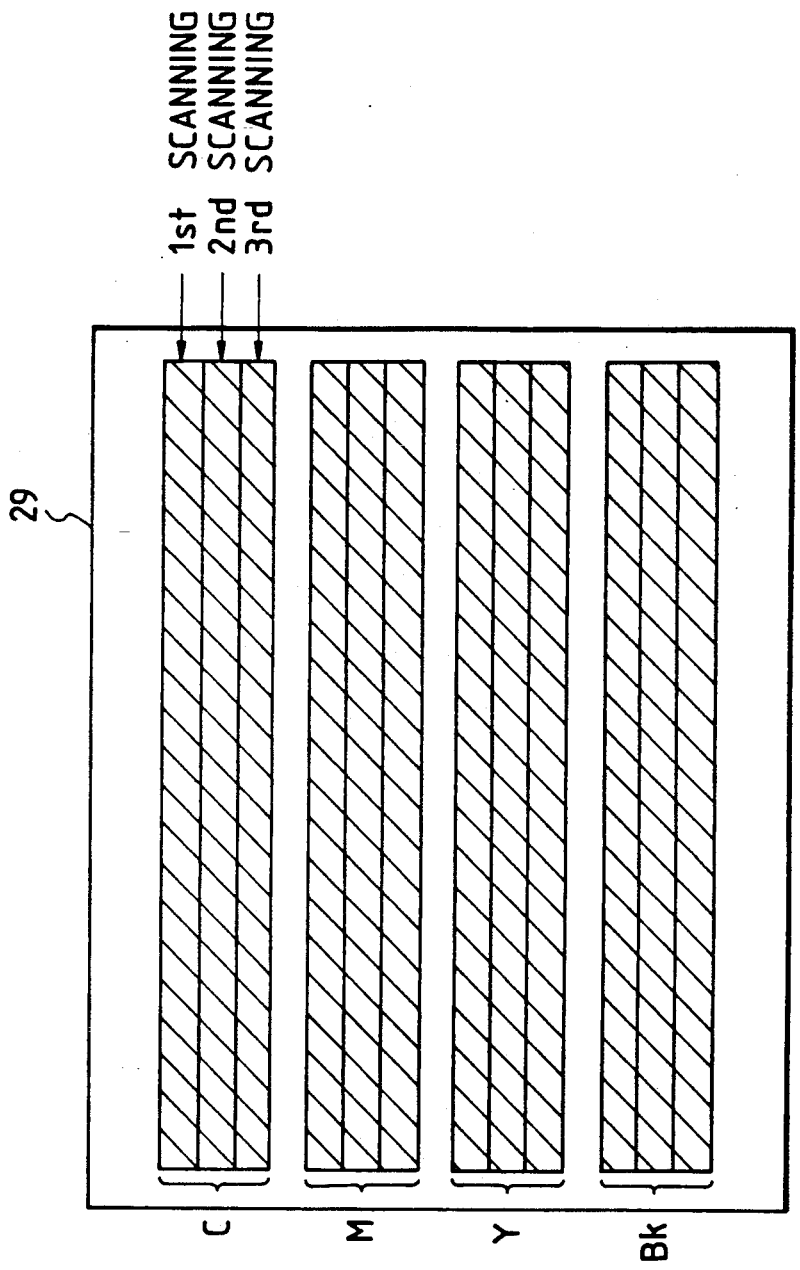

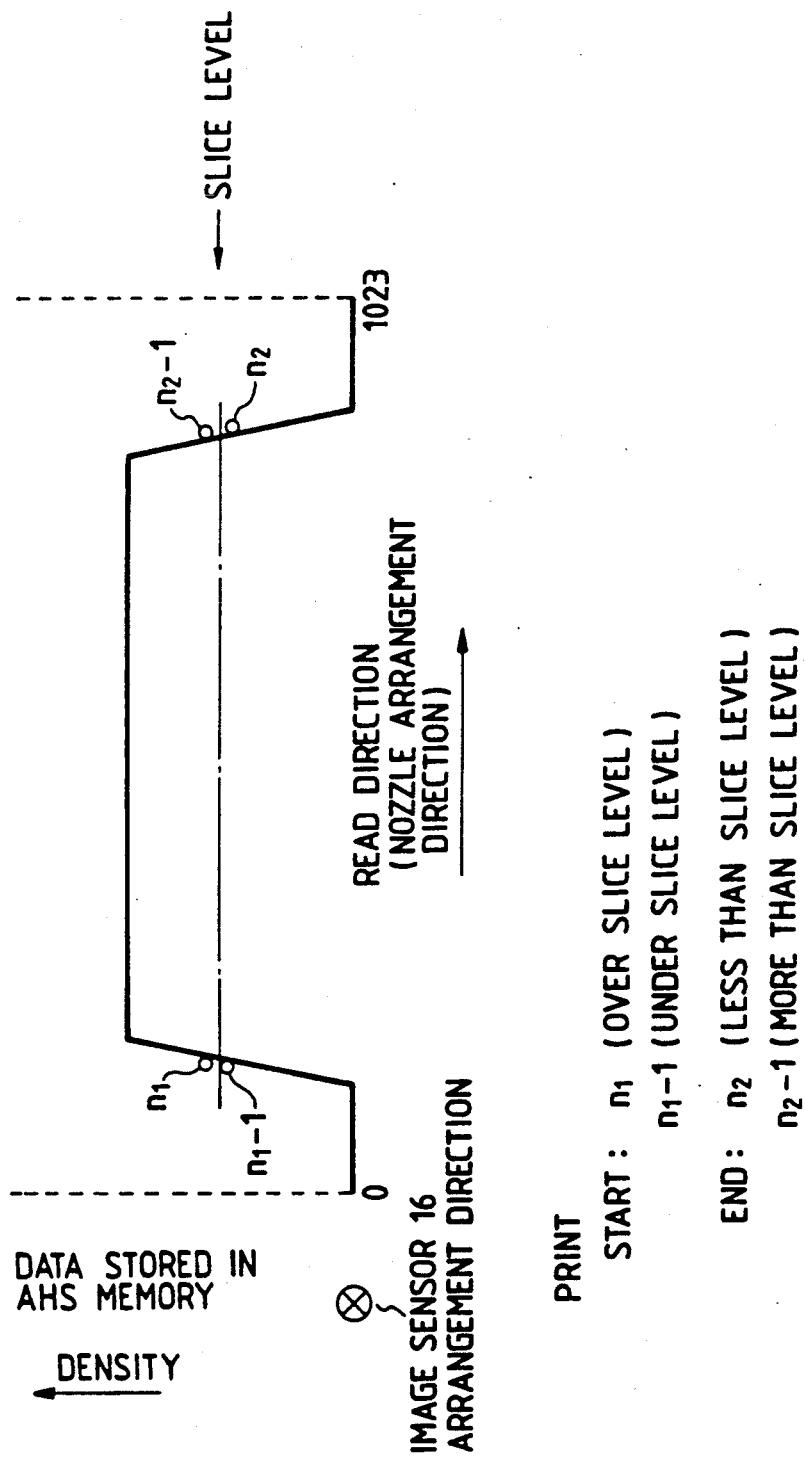

IMAGE FORMING APPARATUS AND METHOD FOR CORRECTION IMAGE DENSITY NON-UNIFORMITY BY READING A TEST PATTERN RECORDED BY THE APPARATUS

BACKGROUND OF THE INVENTION

1. Field of the Invention

The present invention relates to an image forming apparatus and method and, more particularly, to an image forming apparatus and method for performing image formation using a recording head having an array of a plurality of recording elements.

In particular, the present invention relates to an apparatus comprising a mechanism for automatically adjusting printing characteristics of a recording head of an ink-jet recording apparatus, and is particularly suitable for an apparatus for forming a multi-gradation color image by overlaying ink droplets.

2. Related Background Art

Along with an increase in popularity of information processing equipment such as copying machines, word-processors, computers, and the like, and communication equipment, apparatuses for performing digital image recording using a recording head based on an ink-jet system or a thermal transfer system have increasingly become popular as image forming (recording) apparatuses for such equipment. Such a recording apparatus normally employs a recording head constituted by integrating a plurality of recording elements (also referred to as a multi head hereinafter) so as to increase recording speed.

For example, of ink-jet recording heads, a so-called multi-nozzle head constituted by integrating a plurality of ink discharging orifices and liquid channels is normally used. In a thermal head of a thermal transfer system or a thermal system, a plurality of heaters are normally integrated.

However, it is difficult to manufacture uniform recording elements in a multi head due to variations of characteristics caused by manufacturing processes, variations of characteristics caused by head constituting materials, and the like. Thus, the characteristics of the recording elements suffer from variations to some extent. For example, in the multi-nozzle head, the shapes of the discharging orifices and liquid channels suffer from variations, and in the thermal head, the shapes of heaters, resistors, and the like also suffer from variations. Such nonuniform characteristics of the recording elements appear as nonuniform sizes and densities of recorded dots, resulting in density nonuniformity in a recorded image.

In order to solve this problem, various methods of visually finding density nonuniformity, or visually checking an adjusted image, and manually correcting signals to be supplied to the recording elements to obtain a uniform image have been proposed.

For example, the following manual correction means is known. That is, in a multi head 330 having an array of recording elements 331, as shown in FIG. 26A, if density nonuniformity is visually found, as shown in FIG. 26C when uniform signals are input to the recording elements, as shown in FIG. 26B, the input signals are corrected, as shown in FIG. 26D, so that large input signals are supplied to the recording elements corresponding to a low-density portion, and small input signals are supplied to the recording elements corresponding to a high-density portion.

As is well known, in a recording system capable of modulating a dot size or a dot density, recording elements modulate recording dot sizes in accordance with an input to attain multi-gradation recording. For example, in an ink-jet recording head based on a piezo system or a system utilizing thermal energy, drive voltages or pulse widths of signals applied to discharging energy generating elements such as piezo elements, electricity-heat converters, and the like are modulated according to an input signal. In a thermal head, drive voltages or pulse widths of signals to be applied to heaters are modulated according to an input signal. By utilizing these operations, it is possible to make uniform dot sizes or dot densities of the recording elements, thereby obtaining a uniform density distribution, as shown in FIG. 26E.

In some cases, it is impossible or difficult to modulate the drive voltages or pulse widths, or it is difficult to adjust a density over a wide range even when the drive voltages or pulse widths are modulated. In this case, for example, when one pixel is constituted by a plurality of dots, the number of dots to be recorded is modulated in accordance with an input signal, so that a large number of dots can be recorded for a low-density portion, and a small number of dots can be recorded for a high-density portion. When one pixel is constituted by one dot, the number of ink discharging operations (the number of injections) for one pixel can be modulated to change a dot size. With these operations, the density distribution can be uniform, as shown in FIG. 26E.

In order to solve the above-mentioned problem, the following means is effective. That is, a density nonuniformity reading unit is arranged in an image forming apparatus. A serviceman or a user places a test pattern recorded by using a head on the reading unit, and a density nonuniformity distribution in a recording element array range is periodically read to regenerate density nonuniformity correction data. With this means, even when the density nonuniformity distribution of the head is changed, the correction data is regenerated accordingly. Therefore, a uniform image free from a nonuniformity can be maintained. As such image recording apparatus, see U.S. Pat. No. 5,038,208 and U.S. patent applications Ser. No. 07/480,041 (filed Feb. 14, 1990) and Ser. No. 07/516,129 (filed Apr. 27, 1990).

However, in such as arrangement, the following problems are left unsolved.

A nonuniformity measurement test pattern formed by a recording head is used in density nonuniformity reading. When the relationship between a reading range by the reading means and the size of the test pattern, or the positional relationship therebetween is not proper, light reflected by a background portion of a recording medium located outside the edge portion of the test pattern is incident on a reading sensor, or there is a problem of incidence of reflected light. As a result, precise density reading cannot be performed.

Upon correction, when the test pattern is recorded in a state wherein there is a recording element which cannot perform a normal recording operation (e.g., a discharging orifice suffering from a discharging error in an ink-jet recording head), the density nonuniformity cannot be correctly recognized due to the presence of such a recording element.

SUMMARY OF THE INVENTION

It is a principal object of the present invention to provide an image forming apparatus capable of performing precise density nonuniformity correction.

It is another object of the present invention to provide an image forming apparatus capable of easily performing a density nonuniformity correction procedure.

It is still another object of the present invention to provide an image forming apparatus capable of performing appropriate density nonuniformity correction using a reading unit for reading an original.

In order to achieve the above object, the present invention is characterized by an image forming apparatus for recording an original image read by a reading unit on a recording medium using a recording head having an array of a plurality of recording elements, comprising pattern forming means for forming, on the recording medium, a test pattern having an area larger than an array range of the plurality of recording elements using the recording head in accordance with a predetermined operation, detection means for causing the reading unit to read the test pattern formed on the recording medium by the pattern forming means in accordance with a predetermined operation, and detecting a density distribution within the array range of the plurality of recording elements, generation means for generating correction data of a drive condition for uniforming a density during image formation on the basis of the density distribution detected by the detection means in correspondence with the plurality of recording elements, and guide means for displaying the predetermined operations on a display unit.

The present invention is characterized by an image forming method of causing a reading unit to read an original placed on an original table, and causing a recording head having an array of a plurality of recording elements to record the read original on a recording medium, comprising: the step of displaying, on a display unit, a message for urging an operator to perform a first operation for forming a test pattern; the step of forming, on the recording medium, the test pattern having an area larger than an array range of the recording elements by the recording head when the first operation is performed; the step of displaying, on the display unit, a message for urging the operator to perform a second operation for placing the recording medium formed with the test pattern on the original table, and reading the test pattern; the step of causing the reading unit to read the test pattern, and detecting a density distribution within the array range of the plurality of recording elements when the second operation is performed; the step of generating correction data of a drive condition for uniforming a density during image formation on the basis of the density distribution; and the step of causing the recording head to record an original image read by the reading unit on the recording medium under the drive condition corrected by the correction data.

BRIEF DESCRIPTION OF THE DRAWINGS

FIG. 16 is an explanatory view showing a test pattern used in this embodiment;

FIGS. 20 and 21(1) to 21(4) are explanatory views for explaining processing for determining whether or not the test pattern is precisely placed on the scanner unit;

DETAILED DESCRIPTION OF THE PREFERRED EMBODIMENTS

An embodiment of the present invention will be described in detail below. In the embodiment to be described below, an image forming apparatus using an ink-jet recording method will be exemplified. As an ink-jet recording apparatus applied to the image forming apparatus, an apparatus having a so-called multi-nozzle head having a plurality of discharging orifices for discharging an ink as recording elements of a multi head will be exemplified.

Description of Appearance

Figure 1:
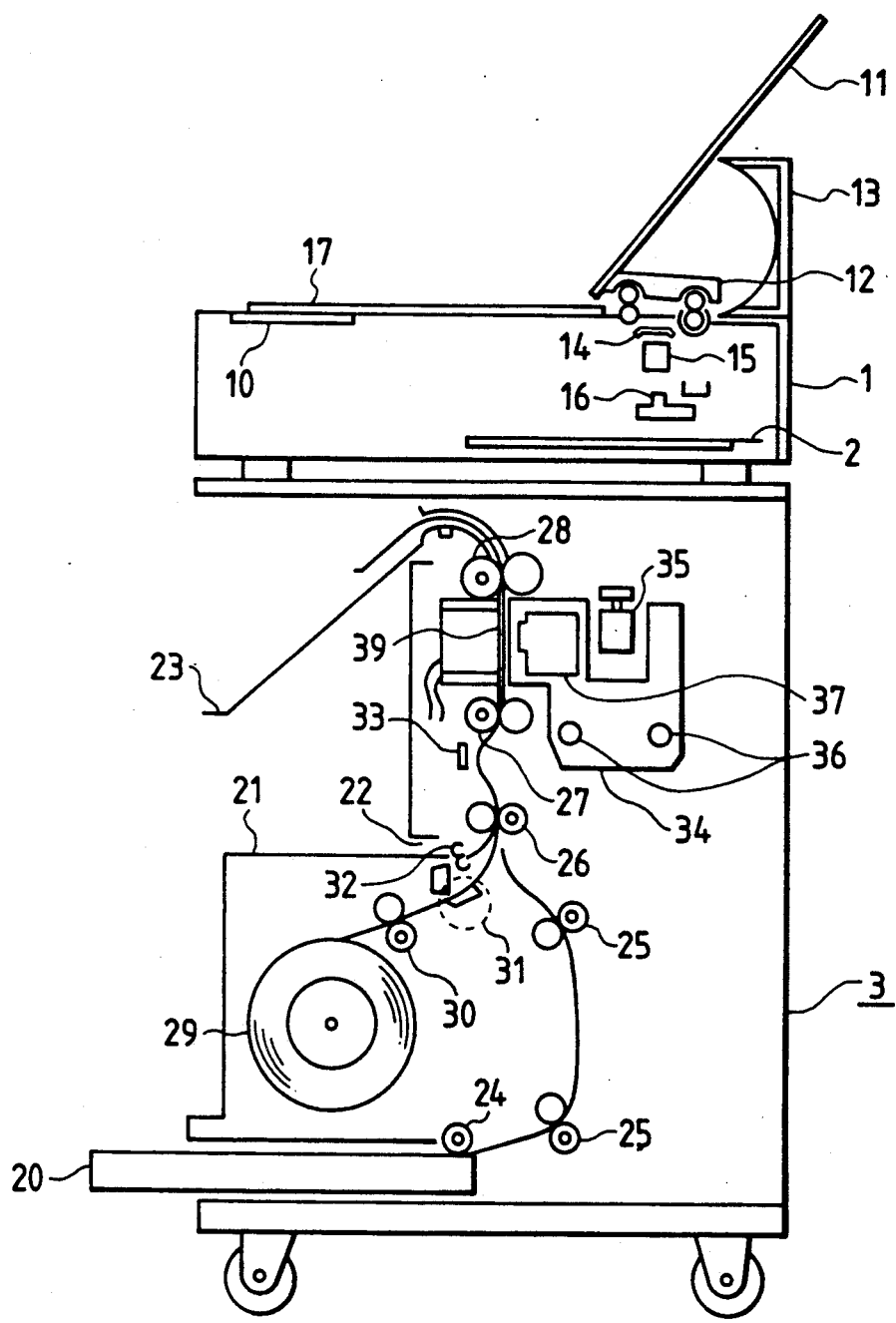
FIG. 1 is a side view showing an arrangement of an image forming apparatus to which the present invention is applied.

FIG. 1 is a sectional view of a digital color copying machine to which the present invention is applied.

The overall machine can be divided into two sections.

The upper section shown in FIG. 1 is constituted by a color image scanner unit 1 (to be simply referred to as a scanner unit 1 hereinafter) for reading an original image, and outputting digital color image data, and a controller unit 2, incorporated in the scanner unit 1, and having a processing function, e.g., an interface function with an external apparatus, for performing various image processing operations of digital color image data.

The scanner unit 1 reads a three-dimensional object, a sheet original, or the like placed facing down under an original press 11, and incorporates a mechanism for reading a large-size sheet original.

A console 10 is connected to the controller unit 2, and is used for inputting various data of the copying machine. The controller unit 2 issues instructions associated with operations of the scanner unit 1 and a printer unit 3 in accordance with the input data. When complicated edit processing is required, for example, a digitizer is mounted in place of the original press 11, and is connected to the controller unit 2 to allow high-grade processing.

The lower section shown in FIG. 1 corresponds to the printer unit 3 for recording a color digital image signal output from the controller unit 2 on a recording sheet. In this embodiment, the printer unit 3 comprises a full-color ink-jet printer using an ink-jet recording head disclosed in U.S. Pat. No. 4,723,129.

The above-mentioned two sections can be separated, and can be arranged at remote places by using a connection cable.

Printer unit

An original image placed on an original table glass 17, or a sheet original image fed from a sheet feed mechanism 12 is read using an exposure lamp 14, a lens 15, and an image sensor 16 (a CCD in this embodiment) capable of reading a full-color line image. Various image processing operations are then executed by the scanner unit 1 and the controller unit 2, and processed data is recorded on a recording sheet by the printer unit 3.

In FIG. 1, a recording sheet is fed from a paper feed cassette 20 for storing cut sheets having small standard sizes (A4 to A3 sizes in this embodiment), or from roll paper 29 used for performing large-size recording (A2 to A1 sizes in this embodiment).

A paper feed operation from the outside the apparatus (manual paper feed) is also available by inserting recording sheets one by one from a manual insertion port 22 (FIG. 1) along a paper feed unit cover 21.

A pickup roller 24 feeds cut sheets one by one from the paper feed cassette 20. A fed cut sheet is conveyed to first paper feed rollers 26 by cut sheet feed rollers 25.

The roll paper 29 is fed by roll paper feed rollers 30, and is cut into a standard length by a cutter 31. The cut sheet is then fed to the first paper feed rollers 26.

Similarly, a recording sheet inserted from the manual insertion port 22 is conveyed to the first paper feed rollers 26 by manual insertion rollers 32.

The pickup roller 24, the cut sheet feed rollers 25, the roll paper feed rollers 30, the first paper feed rollers 26, and the manual insertion rollers 32 are driven by a paper feed motor (not shown; in this embodiment, a DC servo motor is used), and can be desirably ON/OFF-controlled by electromagnetic clutches attached to the corresponding rollers.

When a print operation is started in response to an instruction from the controller unit 2, a recording sheet selected and fed by one of the above-mentioned paper feed paths is conveyed to the first paper feed rollers 26. In order to prevent the recording sheet from skewing, a predetermined amount of paper loop is formed, and thereafter, the first paper feed rollers 26 are enabled to convey the sheet to second paper feed rollers 27.

When the print operation is performed using recording heads 37, a scanning carriage 34 on which the recording heads 37, and the like are mounted reciprocally scans along carriage rails 36 by a scanning motor 35. In forward scanning, an image is printed on the recording sheet, and in backward scanning, the recording sheet is fed by a predetermined amount by paper feed rollers 28.

The printed recording sheet is exhausted onto an exhaust tray 23, thus completing the print operation.

Figure 2:
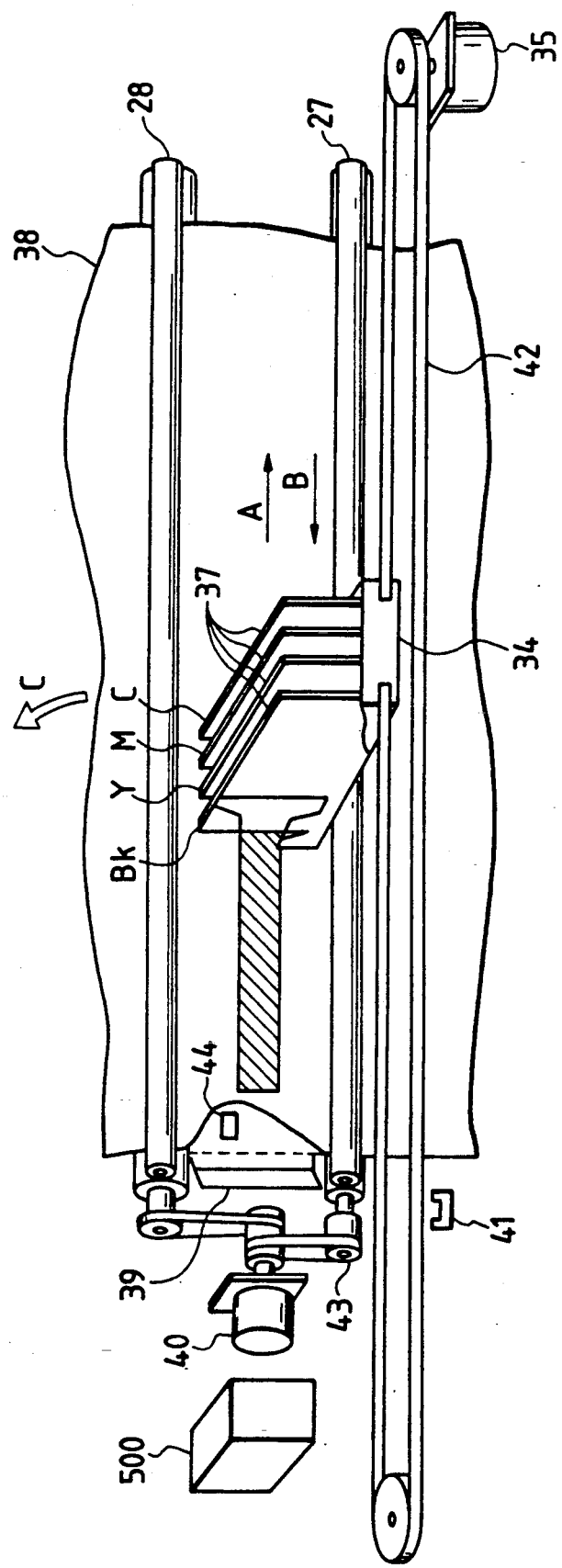
FIG. 2 is a perspective view showing a schematic structure of a printer unit shown in FIG. 1.

Components around the scanning carriage 34 will be described in detail below with reference to FIG. 2.

A paper feed motor 40 serves as a drive source for intermittently feeding a recording sheet, and drives the paper feed rollers 28 and the second paper feed rollers 27 via a roller clutch 43.

The scanning motor 35 serves as a drive source for scanning the scanning carriage 34 in directions of arrows A and B via a scanning belt 42. In this embodiment, since precise paper feed control is required, the paper feed motor 40 and the scanning motor 35 comprise pulse motors.

When the recording sheet reaches the second paper feed rollers 27, the second paper feed rollers 27, the roller clutch 43 for the second paper feed rollers, and the paper feed motor 40 are enabled to convey the recording sheet to the paper feed rollers 28 along a platen 39.

The recording sheet is detected by a sheet sensor 44 arranged on the platen 39, and sensor data is utilized in position control, jam control, and the like.

When the recording sheet reaches the paper feed rollers 28, the second paper feed rollers 27, the roller clutch 43 for the second paper feed rollers, and the paper feed motor 40 are disabled, and a chucking operation is performed from inside the platen 39 by a chucking motor (not shown), thus causing the recording sheet to contact the surface of the platen 39.

Prior to an image recording operation onto the recording sheet, the scanning carriage 34 is moved to a position of a home position sensor 41. The forward scanning is then performed in the direction of the arrow A, and cyan, magenta, yellow, and black inks are discharged from the recording heads 37 from a predetermined position, thereby performing image recording. Upon completion of the image recording for a predetermined length, the scanning carriage 34 is stopped, and the backward scanning is then started in the direction of the arrow B, thereby returning the scanning carriage 34 to the position of the home position sensor 41. During the backward scanning, the recording sheet is fed in a direction of an arrow C by a length recorded by the recording heads 37 by driving the paper feed rollers 28 by the paper feed motor 40.

In this embodiment, the recording head 37 is of a type for forming bubbles by heat, and discharging ink droplets by the pressure of the bubbles, and four heads each assembled with 256 discharging orifices are used.

When the scanning carriage 34 is stopped at the home position detected by the home position sensor 41, a recovery operation of the recording heads 37 is performed using a recovery device 500. The recovery operation is processing for performing a stable recording operation. More specifically, in this operation, a suction operation, an ink non-recording discharging operation, and the like of the recording heads 37 are performed under the preprogrammed conditions such as a paper feed time, a temperature in the apparatus, a discharging time, and the like for the purpose of preventing nonuniformity at the beginning of discharging caused by, e.g., a change in viscosity of inks left in nozzles of the recording heads 37. Note that the recovery device 500 may comprise a cap which can face or contact a discharging orifice formation surface of each recording head 37, a pump for applying a suction force via the cap, and the like.

When the above-mentioned operations are repeated, an image can be recorded on the entire surface of the recording sheet.

Scanner Unit

The operation of the scanner unit 1 will be described below with reference to FIGS. 3 and 4.

Figure 3:
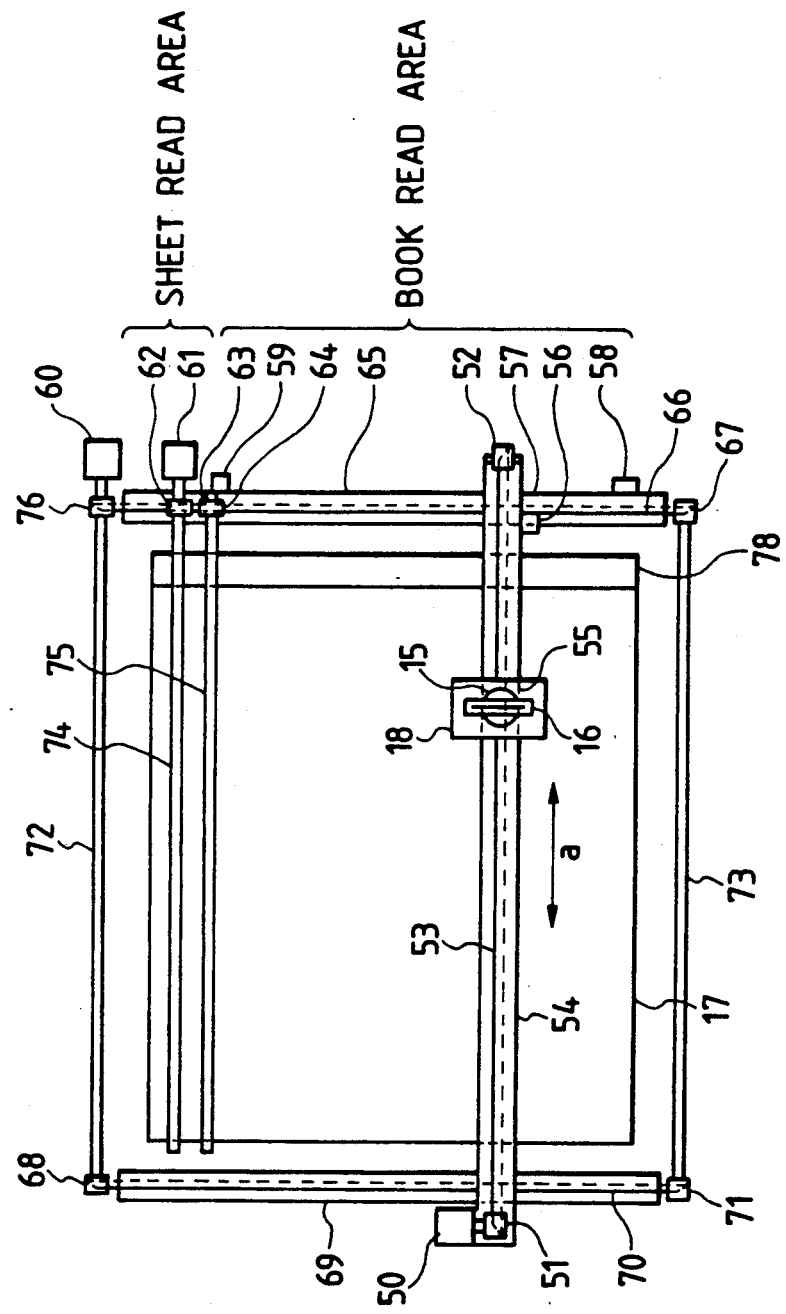
FIGS. 3 and 4 are respectively a plan view showing a structure of a scanner unit shown in FIG. 1, and a chart for explaining the operation of the scanner unit.

FIG. 3 is a view for explaining a mechanism in the scanner unit 1.

A CCD unit 18 is constituted by the CCD 16, the lens 15, and the like, and is moved along a rail 54 by a main scanning drive system comprising a main scanning motor 50 fixed on the rail 54, pulleys 51 and 52, and a wire 53, thereby reading an image on the original table glass 17 in the main scanning direction. A light shielding plate 55 and a home position sensor 56 are used in position control executed when the CCD unit 18 is moved to the main scanning home position present in a correction area 78 shown in FIG. 3.

The rail 54 is bridged on rails 65 and 69, and is moved by a subscanning drive system comprising a subscanning motor 60, pulleys 67, 68, 71, and 76, shafts 72 and 73, and wires 66 and 70. A light shielding plate 57, and home position sensors 58 and 59 are used in position control executed when the rail 54 is moved to subscanning home positions respectively in a book mode for reading an original, e.g., a book placed on the original table glass 17, and in a sheet mode for reading a sheet.

A sheet feed motor 61, sheet feed rollers 74 and 75, pulleys 62 and 64, and a wire 63 constitute a mechanism for feeding a sheet original. This mechanism is located on the original table glass 17, and feeds a sheet original placed facing down on the glass 17 by a predetermined amount using the sheet feed rollers 74 and 75.

Figure 4:
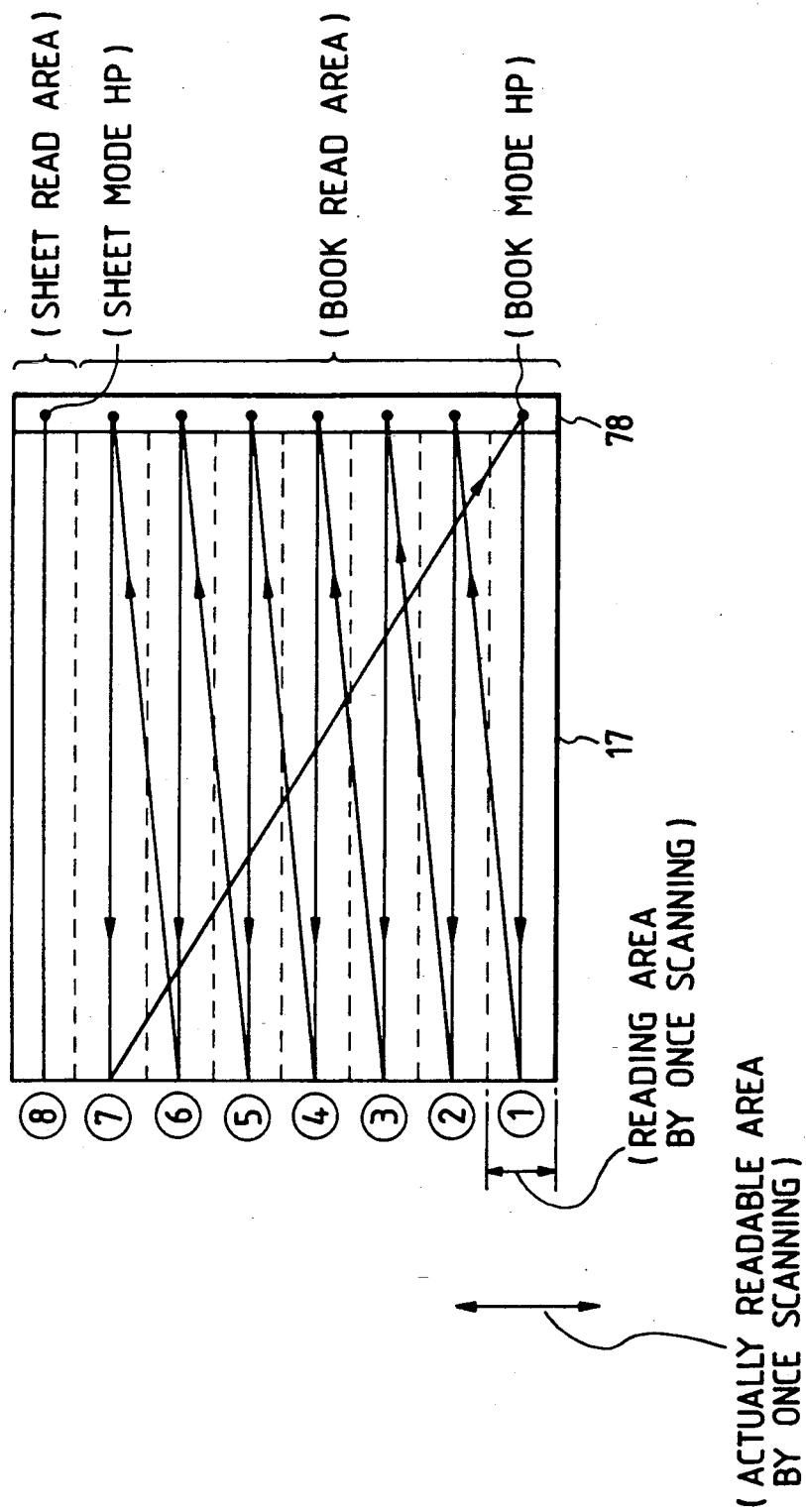

FIG. 4 is an explanatory view of reading operations in the book mode and the sheet mode.

In the book mode, the CCD unit 18 is moved to a book mode home position (book mode HP) present in the correction area 78 in FIG. 4, and the reading operation of the entire surface of an original placed on the original glass table 17 is started from this position.

Prior to the scanning of the original, data necessary for processing operations such as shading correction, black level correction, color correction, and the like are set in the correction area 78. Thereafter, the main scanning operation is started by the main scanning motor 50 in a direction of an arrow in FIG. 3. Upon completion of the reading operation of an area indicated by ①, the main scanning motor 50 is reversed, and the subscanning motor 60 is started, thereby performing subscanning movement to the correction area 78 of an area indicated by ②. Subsequently, in the same manner as in the main scanning operation of the area ①, processing operations such as shading correction, black level correction, color correction, and the like are performed as needed, and then, the reading operation of the area ② is performed.

Upon repetition of the above-mentioned scanning operations, reading operations of the entire areas ① to ⑦ are performed. Upon completion of the reading operation of the area ⑦, the CCD unit 18 is returned to the book mode home position again.

In this embodiment, since an original having a maximum of A2 size can be read on the original table glass 17, a larger number of scanning operations must be performed in practice. In the above description, however, the scanning operations are simplified for the sake of easy understanding.

In the sheet mode, the CCD unit 18 is moved to a sheet mode home position (sheet mode HP) shown in FIG. 4, and a sheet original in an area ⑧ is repetitively read while intermittently operating the sheet feed motor 40, thereby reading the entire surface of the sheet original.

Prior to the original scanning operation, processing operations such as shading correction, black level correction, color correction, and the like are performed in the correction area 78. Thereafter, the main scanning operation is started by the main scanning motor 50 in the direction of an arrow (arrow a in FIG. 3). Upon completion of the forward reading operation of the area ⑧, the main scanning motor 50 is reversed. During backward scanning, the sheet feed motor 61 is driven to move the sheet original in the subscanning direction by a predetermined amount. Subsequently, the same operations are repeated, thereby reading the entire surface of the sheet original.

If the above-mentioned reading operations correspond to equal-magnification reading operations, an area to be read by the CCD unit 18 is actually a wide area, as shown in FIG. 4. This is because the digital color copying machine of this embodiment has a variable magnification, e.g., enlargement/reduction function. More specifically, as described above, an area which can be recorded by the recording head 37 is permanently set to be 256 bits per recording operation. For example, when a 50% reduction operation is to be performed, image data corresponding to a minimum of a 512-bit area twice the recording area of the head 37 is required. Therefore, the scanner unit 1 has a function of reading and outputting image data in an arbitrary image area by a single main scanning reading operation.

Description of Overall Functional Blocks

The functional blocks of the digital color copying machine of this embodiment will be described below with reference to FIG. 5.

Control units 102, 111, and 121 respectively control the scanner unit 1, the controller unit 2, and the printer unit 3. Each of the control units 102, 111, and 121 comprises a microcomputer, a program ROM, a data memory, a communication circuit, and the like. The control units 102 and 111, and the control units 111 and 121 are connected through communication lines. In this embodiment, a so-called master-slave control system is employed. In this system, the control units 102 and 121 execute operations in accordance with instructions from the control unit 111.

The control unit 111 performs control operations in accordance with instructions input from the console 10 and a digitizer 114 in a color copying machine mode.

The digitizer 114 is used for inputting position data necessary for trimming processing, masking processing, and the like, and is connected as an optional component when complicated edit processing is required.

The control unit 102 controls a mechanism drive unit 105 for performing drive control of the mechanism of the scanner unit 1 described above, controls an exposure control unit 103 for performing exposure control of a lamp in a reflective original reading mode, and also controls an exposure control unit 104 for performing exposure control of a projector. The control unit 102 also controls an analog signal processing unit 100, and an input image processing unit 101 for performing various processing operations associated with an image.

The control unit 121 controls a mechanism control unit 122 for performing drive control of the mechanism of the printer unit 3 described above, and a synchronization delay memory 115 for absorbing a variation in time of the mechanical operations in the printer unit 3, and correcting a delay time caused by the mechanical arrangement of recording heads 117 to 120.

The image processing blocks shown in FIG. 5 will be described in more detail along the flow of an image.

An image formed on the CCD 16 is converted into analog electrical signals by the CCD 16. The converted image data are serially processed in the order of, e.g., red→green→blue, and the processed data are input to the analog signal processing unit 100. The analog signal processing unit 100 executes a sample & hold operation, dark level correction, and dynamic range control, and the like in units of colors (red, green, and blue), and then analog-to-digital (A/D) converts the analog image data into serial multi-value (8 bits per color in this embodiment) digital image signals. The unit 100 outputs the digital image signals to the input image processing unit 101.

The input image processing unit 101 executes correction processing operations, such as CCD correction, $\gamma$ correction, and the like required in a reading system, using the serial multi-value digital image signals.

An image processing unit 107 executes smoothing processing, edge emphasis processing, black extraction processing, masking processing for color correction of recording inks used in the recording heads 117 to 120, and the like. The serial multi-value digital image signal outputs are input to both a binarizing processing unit 108, and a memory (HS memory) 123 used in nonuniformity correction.

The binarizing processing unit 108 binarizes the serial multi-value digital image signals, and can select one of a simple binarizing mode using a fixed slice level, a pseudo halftone processing mode based on a dither method, and the like. The serial multi-value digital image signals are converted into binary parallel image signals corresponding to four colors by the unit 108.

The synchronization delay memory 115 absorbs a variation in time of the mechanical operations of the printer unit 3, and corrects a delay time caused by the mechanical arrangement of the recording heads 117 to 120. The memory 115 can internally generate timings necessary for driving the recording heads 117 to 120.

A head driver 116 is an analog drive circuit for driving the recording heads 117 to 120, and internally generates signals which can directly drive the recording heads 117 to 120.

The recording heads 117 to 120 respectively discharge cyan, magenta, yellow, and black inks, and record an image on a recording sheet.

Figure 5:
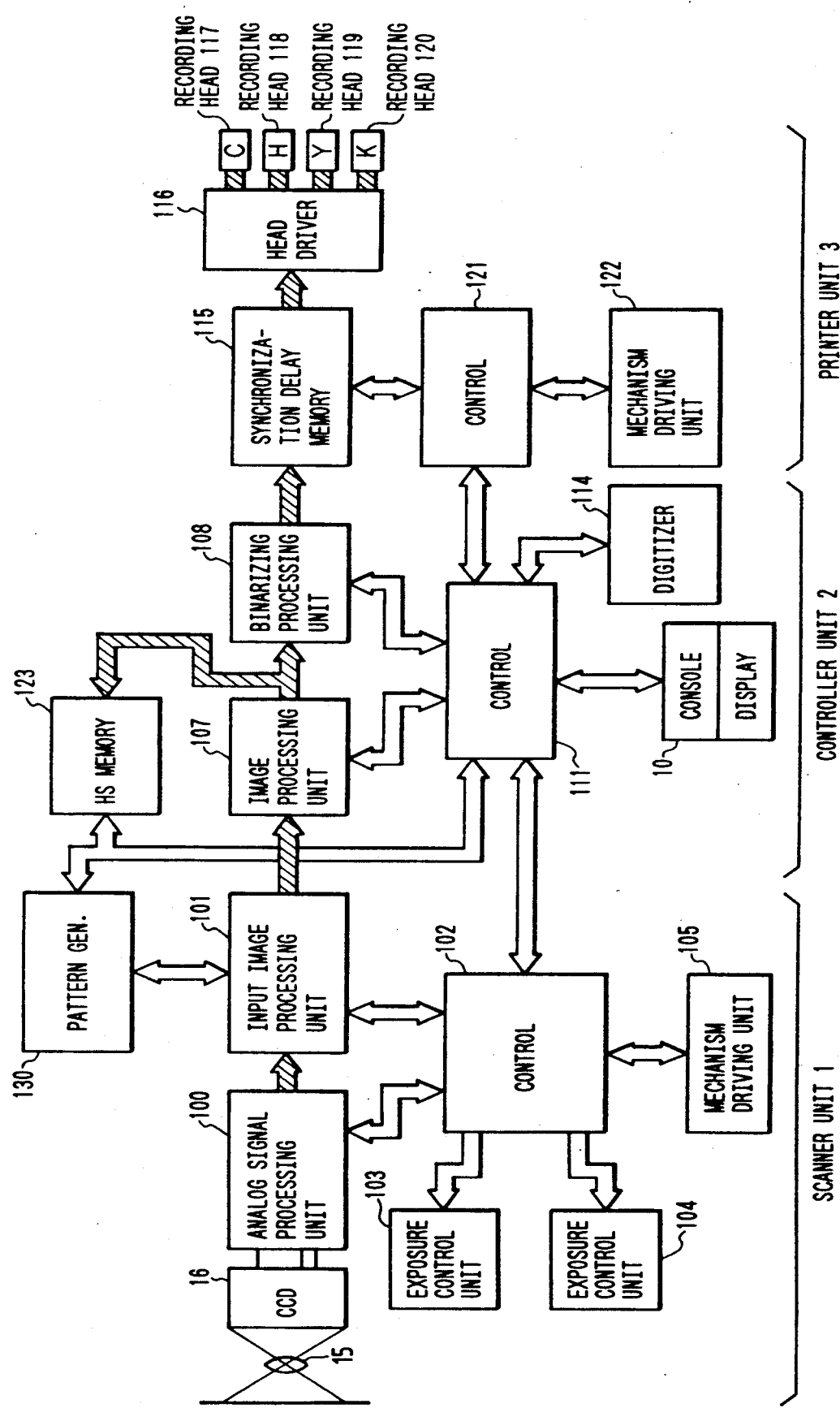
FIG. 5 is a block diagram showing an arrangement of a control system of the apparatus shown in FIG. 1.
Figure 6:
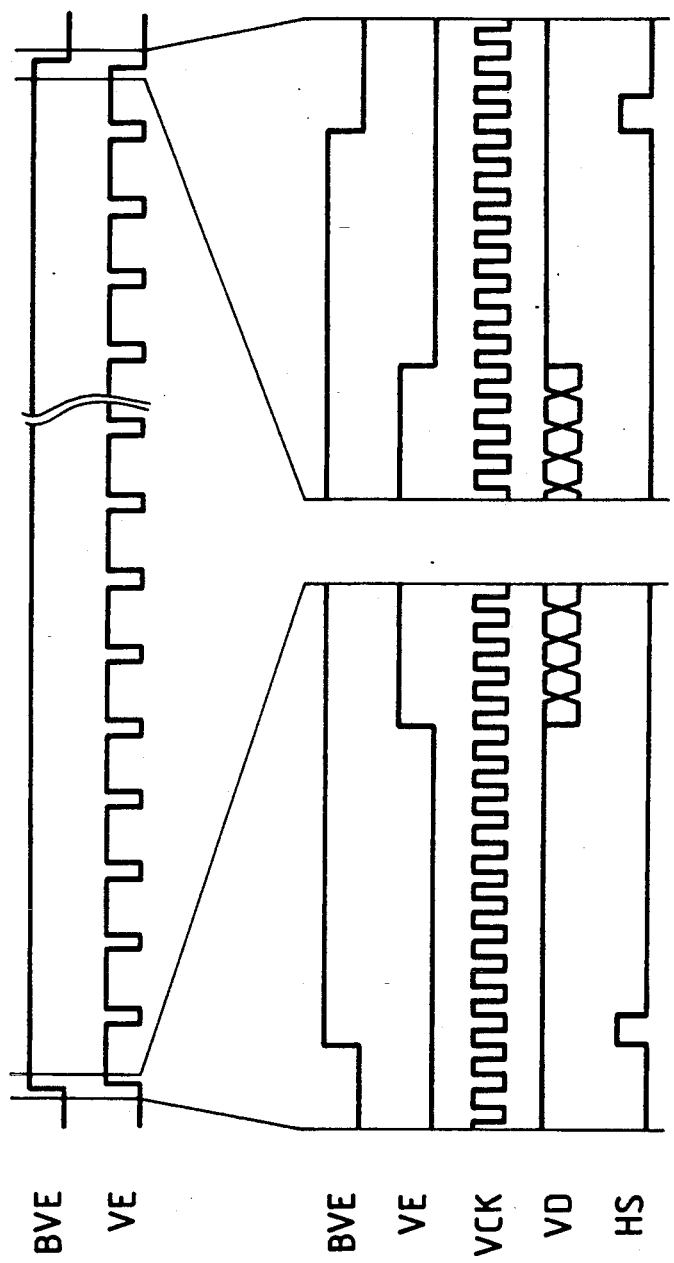
FIG. 6 is a timing chart of the respective units shown in FIG. 5.

FIG. 6 is an explanatory view of image timings among the circuit blocks described above with reference to FIG. 5.

A signal BVE indicates an image enable period in units of scanning lines of the main scanning reading operations described above with reference to FIG. 4. When the signal BVE is output a plurality of times, an image of the entire frame is output. A signal VE indicates an image enable period in units of lines read by the CCD 16. When the signal BVE is enabled, only the signal VE is enabled.

A signal VCK is an output clock signal for image data VD. The signals BVE and VE are changed in synchronism with the signal VCK. A signal HS is used when the signal VE discontinuously repeats enable and disable periods while it is output for one line, and is unnecessary when the signal VE is continuously enabled while it is output for one line. The signal HS indicates the beginning of an image output for one line.

Figure 7:
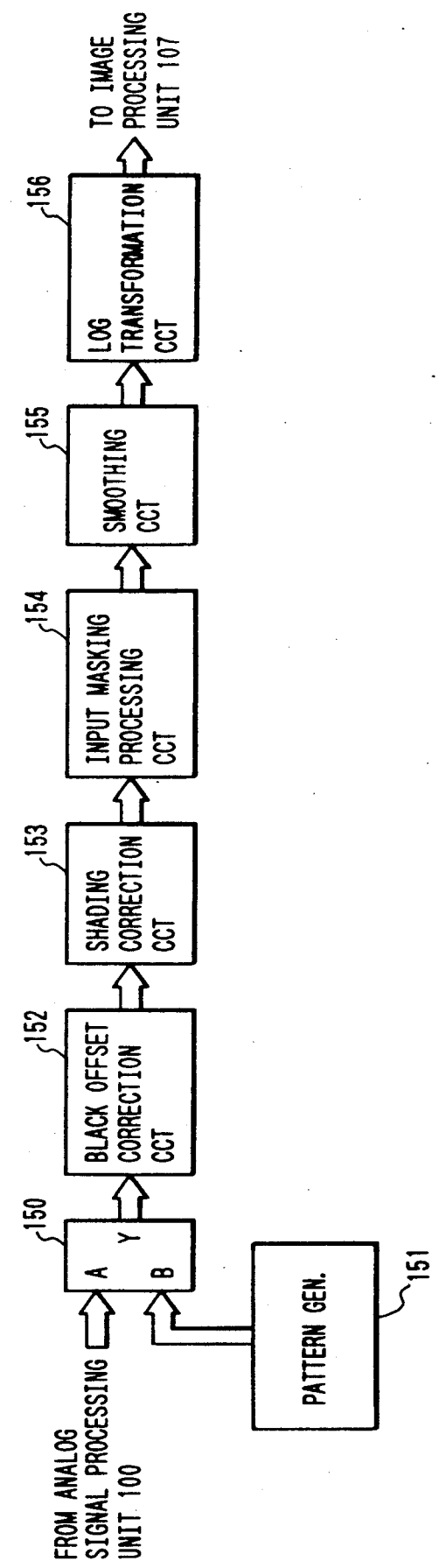
FIG. 7 is a block diagram showing an arrangement of an input image processing unit shown in FIG. 5.

FIG. 7 shows an arrangement of the input image processing unit 101.

In a normal copy mode, and in a mode for reading a pattern for rewriting data for density nonuniformity correction (to be also referred to as HS correction hereinafter), a terminal A of a multiplexer 150 is selected to fetch image sensor data. The image sensor data output from the multiplexer 150 are input to a black offset correction circuit 152, and a shading correction circuit 153 so as to be subjected to shading correction of black and white levels of the image sensor. After the shading correction of the image sensor is performed, red, green, and blue image color signals are corrected by a 3×3 input masking processing circuit 154 so as to remove noise components of filters of the image sensor.

A smoothing circuit 155 executes an operation for eliminating moiré noise which is often generated when a dot original is read since the image sensor used in this embodiment is a digital sensor. For this reason, when a density nonuniformity correction pattern is read, the input signals pass through the operation of the circuit 155 so as to precisely read nozzle data. A log transformation circuit 156 converts red, green, and blue signals into cyan, magenta, and yellow signals in the normal copy mode. However, in the pattern reading mode, since special log transformation (to be described later) is used, the input signals also pass through processing of this circuit.

The image processing unit 107 will be described below with reference to FIG. 8.

In a copy mode, the serial image signals C, M, and Y generated as described above are sent to a serial-to-parallel converter 201, and are converted into parallel signals Y (yellow), M (magenta), and C (cyan). Thereafter, these parallel signals are sent to a masking unit 202 and a selector 203.

The masking unit 202 is a circuit for correcting color muddiness of output inks, and performs the following calculation:

$$\begin{bmatrix} Y' \\ M' \\ C' \end{bmatrix} = \begin{bmatrix} a11 & a12 & a13 \\ a21 & a22 & a23 \\ a31 & a32 & a33 \end{bmatrix} \begin{bmatrix} Y \\ M \\ C \end{bmatrix}$$

Y, M, C: input data
Y', M', C': output data

These nine coefficients are determined by a masking control signal from a control unit 200. After the parallel signals are subjected to ink muddiness correction by the masking unit 202, they are input to the selector 203 and a UCR unit 205.

The selector 203 receives input image data, and image data output from the masking unit 202. The selector 203 normally selects input image data in accordance with a selector control signal 1 sent from the control unit 200. When color correction in an input system is insufficient, the image data output from the masking unit 202 are selected in response to the control signal 1. Serial image data output from the selector 203 are input to a black extraction unit 204. The black extraction unit 204 detects a minimum value of Y, M, and C signals so as to determine the minimum value of the Y, M, and C signals in one pixel as black data. The detected black data is input to the UCR unit 205.

The UCR unit 205 subtracts the extracted black data from the signals Y, M, and C. The UCR unit 205 simply multiplies black data with a coefficient. A time offset of the black data input to the UCR unit 205 from image data sent from the masking unit 202 is corrected, and the black data is then subjected to the following calculations:

$$Y' = Y - a_1 Bk$$

$$M' = M - a_2 Bk$$

$$C' = C - a_3 Bk$$

$$Bk' = a_4 Bk$$

where Y, M, C, and Bk are the input data to the extraction unit, and Y', M', C', and Bk' are the output data from the extraction unit. Coefficients ($a_1$, $a_2$, $a_3$, and $a_4$) are determined in accordance with a UCR control signal sent from the control unit 200.

The data output from the UCR unit 205 are then input to a γ/offset unit 206.

The γ/offset unit 206 performs gradation correction given by the following equations:

$$Y' = b_1(Y - C_1)$$

$$M' = b_2(M - C_2)$$

$$C' = b_3(C - C_3)$$

$$Bk' = b_4(Bk - C_4)$$

where Y, M, C, and Bk are the input data to the γ/offset unit, and Y', M', C', and Bk' are the output data from the γ/offset unit.

Coefficients ($b_1$ to $b_4$, and $C_1$ to $C_4$) are determined by a γ/offset control signal sent from the control unit 200.

The signals gradation-corrected by the γ/offset unit 206 are then input to a line buffer 207 for storing image data for N lines. The line buffer 207 outputs data for five lines necessary for a next smoothing/edge-emphasis unit 208 on five parallel lines in response to a memory control signal sent from the control unit 200. The signals for five lines are input to a spatial filter whose filter size is variable in accordance with a filter control signal from the control unit 200, and are then subjected to smoothing and then edge emphasis.

Image data output from the smoothing/edge-emphasis unit 208 are input to a color converter 209, and are color-converted in accordance with a color conversion control signal from the control unit 200. Colors to be converted, colors to be obtained, and areas where the signals are effective are input beforehand using the digitizer 114 shown in FIG. 5, and the color converter 209 rewrites image data on the basis of these data. In this embodiment, a detailed description of the color converter 209 will be omitted.

The image signals output from the smoothing/edge-emphasis unit 208 and the color-converted image signals are input to a selector 210, and image data to be output are selected in accordance with a selector control signal 2. Image data to be selected are determined by designating an effective area input by the digitizer 114. The image signals selected by the selector 210 are input to the HS memory 123 or the binarizing processing unit 108 shown in FIG. 5.

In a pattern reading mode, since the R, G, and B signals are input, the control unit 200 sets parameters so that these signals go through the masking operation, and also provides a control to inhibit the black extraction and the UCR operation. In addition, the control unit 200 control provides a to cause the signals to go through the γ/offset unit 206 and the smoothing/edge-emphasis unit 208. Thus, the control unit 200 transfers pattern data to the HS memory 123.

Figure 8:
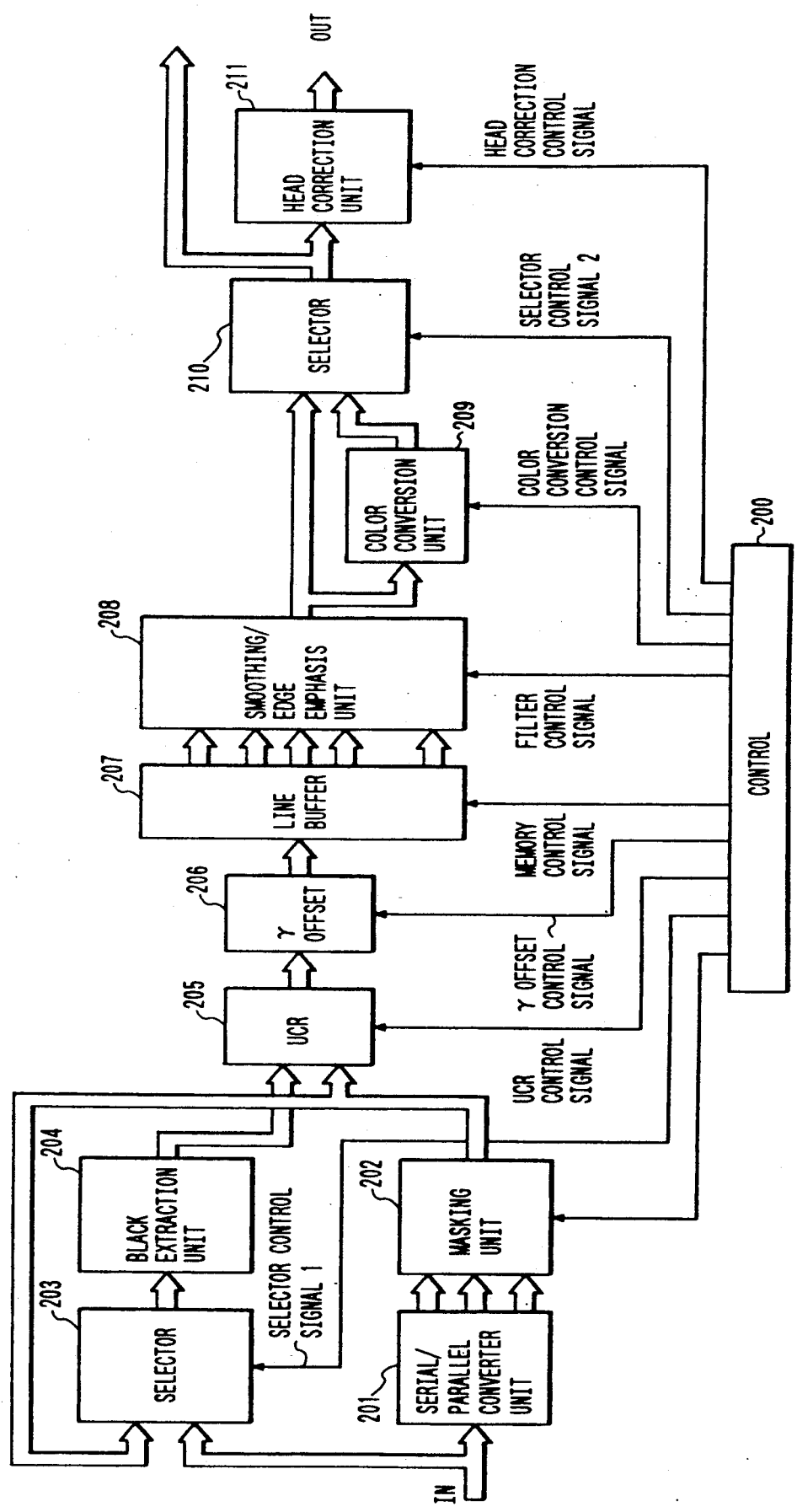
FIG. 8 is a block diagram showing an arrangement of an image processing unit shown in FIG. 5.
Figure 9:
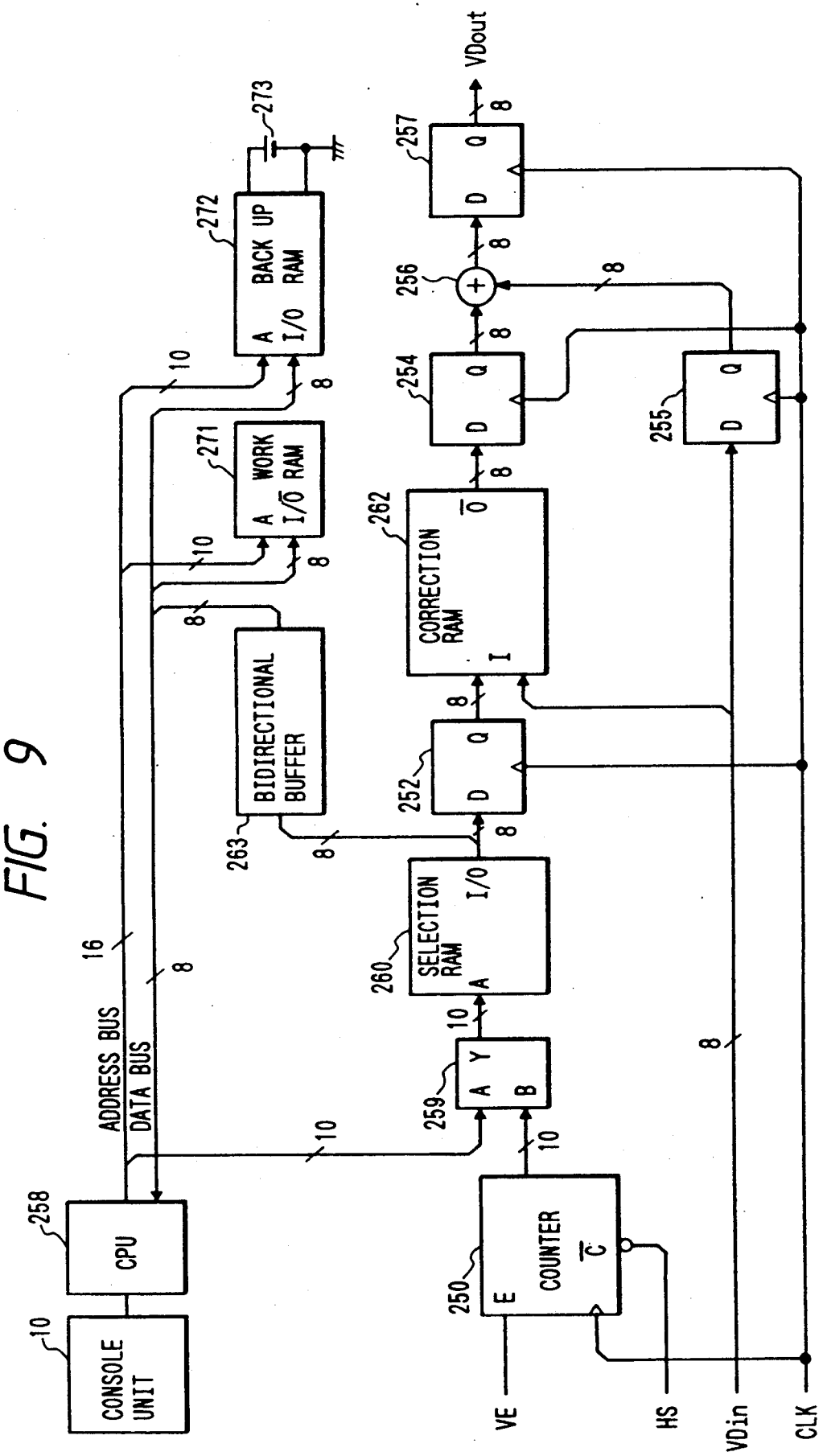
FIG. 9 is a block diagram showing an arrangement of a head correction unit shown in FIG. 8.

FIG. 9 is a block diagram of a head correction unit 211 shown in FIG. 8. In FIG. 9, a counter 250 is an address counter for generating an address for a correction amount selection table RAM 260 (to be simply referred to as a selection RAM hereinafter). In this embodiment, the counter 250 is a 10-bit counter for counting a value corresponding to heads for four colors, each having 256 nozzles, i.e., a total of 1,024 nozzles, and is controlled by signals HS and VE.

A backup RAM 272 stores 256 density nonuniformity characteristic data corresponding to each of the heads C, M, Y, and Bk. A terminal VDin dot-sequentially receives 8-bit digital image data, i.e., color-component image data in units of pixels in the order of, e.g., C, M, Y, K, C, M, Y, K, .... Data read out from the backup RAM 272 is written in the selection RAM 260. This data is correction amount selection data corresponding to the order of input image data, i.e., a nozzle arrangement. A bidirectional buffer 263 is used for writing data read out from the backup RAM 272 in the RAM 260.

A selector 259 selects one of lower 10 bits of a 16-bit address bus address output from a CPU 258, and a 10-bit output from the counter 250. When data is to be written in the RAM 260, the selector 259 selects an output A from the CPU 258; when data is to be read out from the RAM 260, the selector 259 selects an output B from the counter 250.

Data output from the RAM 260 is input to an address terminal of a correction table ROM (to be simply referred to as a correction ROM hereinafter) 262 together with the image data VDin via a flip-flop 252.

Figure 10:
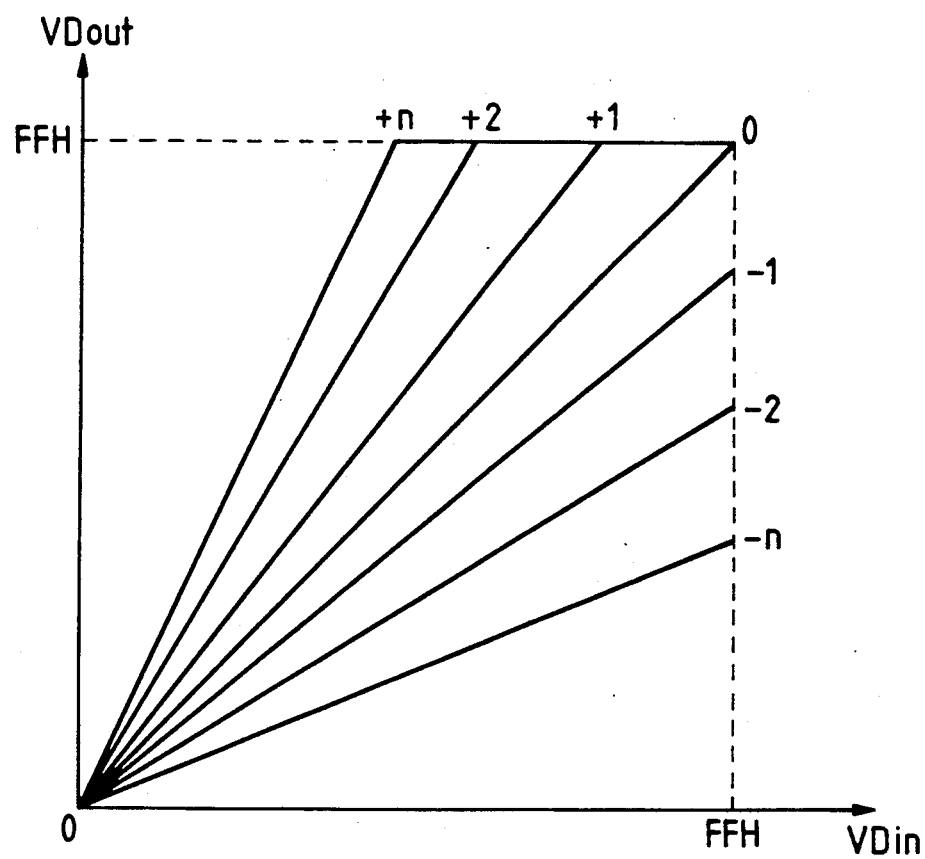
FIG. 10 is an explanatory view of a correction table of the head correction unit.

Correction tables indicated by $-n$ to $+n$ in FIG. 10 are written in advance in the correction ROM 262. FIG. 10 shows $2n+1$ different correction tables. In practice, however, a total of 61 different correction tables need only be prepared for correction amounts of ±30% in units of 1%. Each table written in the correction ROM 262 outputs correction data ΔA for the input A. Correction data ΔA is selected in accordance with the image signal VDin and the selected data input to the address terminal of the ROM 262. The selected correction data ΔA is temporarily latched by a flip-flop 254, and thereafter is added to the input image data A by an adder 256. The sum data is output as corrected data $A + \Delta A$ via a flip-flop 257.

The backup RAM 272 holds data written in the selection RAM 260, and is always backed up by a battery 273. Note that the RAM 272 may comprise a nonvolatile memory.

Nonuniformity Correction Sequence

With the above-mentioned arrangement, in this embodiment, the following processing is executed so as to allow more precise nonuniformity correction.

Upon execution of nonuniformity correction processing, a drive energy (e.g., a drive duty) for discharging energy generation elements corresponding to discharging orifices in a high-density portion of the head is decreased, and contrary to this, a drive energy for discharging energy generation elements corresponding to discharging orifices in a low-density portion is increased. As a result, the density nonuniformity of the recording head can be corrected, and a uniform image can be obtained. However, when the density nonuniformity pattern of the head is changed as the head is used, a nonuniformity correction signal to be used becomes improper, and causes nonuniformity on an image. In this case, nonuniformity correction processing according to this embodiment is started.

Adjustment for preventing density nonuniformity in image formation includes at least one of an operation for uniforming an image density determined by ink droplets from a plurality of ink discharging orifices of a recording head by means of the recording head itself, an operation for uniforming an image density in units of a plurality of heads, and an operation for performing a uniforming operation so that a color obtained by mixing a plurality of inks can provide a desired color or a desired density, and preferably satisfies some of these operations.

As a density uniforming correction means used in the adjustment, a means for reading a reference print for obtaining correction conditions, and for automatically determining the correction conditions is preferably employed, and the present invention does not prevent addition of a manual adjustment device for fine adjustment or user adjustment to this means.

Correction conditions to be obtained include a condition for adjusting data within a predetermined range including an allowable range, a reference density which is changed in accordance with a desired image, and the like as well as an optimal printing condition. That is, all the conditions included in the range of correction can be employed.

For example, as density nonuniformity correction, a correction operation for a multi head having N recording elements (in this embodiment, N=256) for converging printing outputs of the respective elements to an average density value will be exemplified below.

Figure 11:
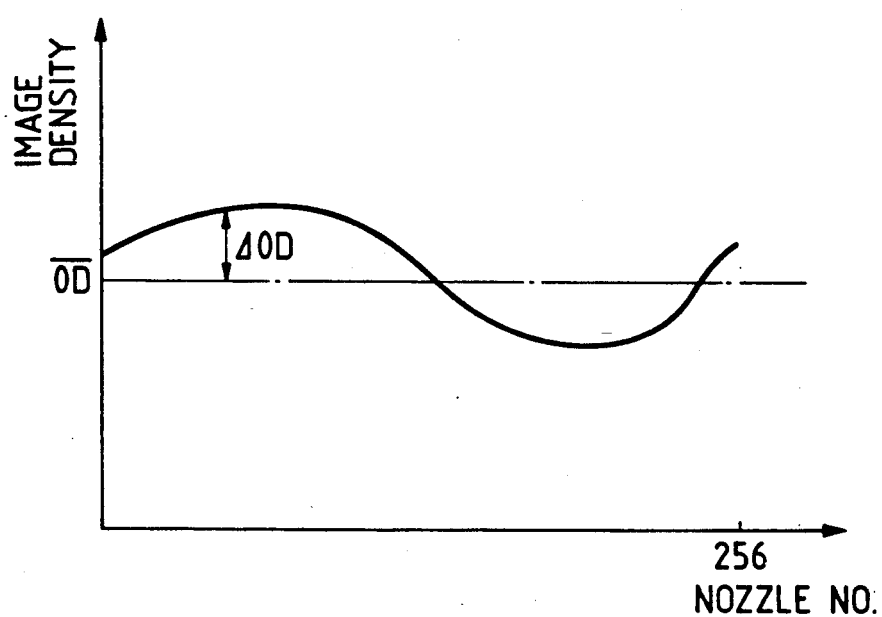
FIGS. 11 to 13 are explanatory views for explaining a density nonuniformity correction mode in a multi-nozzle head.

Assume that a density nonuniformity distribution obtained when a given uniform image signal S is printed is as shown in FIG. 11. Densities $OD_1$ to $OD_{256}$ of portions corresponding to the respective nozzles (recording elements) are measured, and then, an average density $\overline{OD}$ of this head is calculated. Subsequently, $\Delta OD_n = \overline{OD} - OD_n$ (n=1 to 256).

Figure 12:
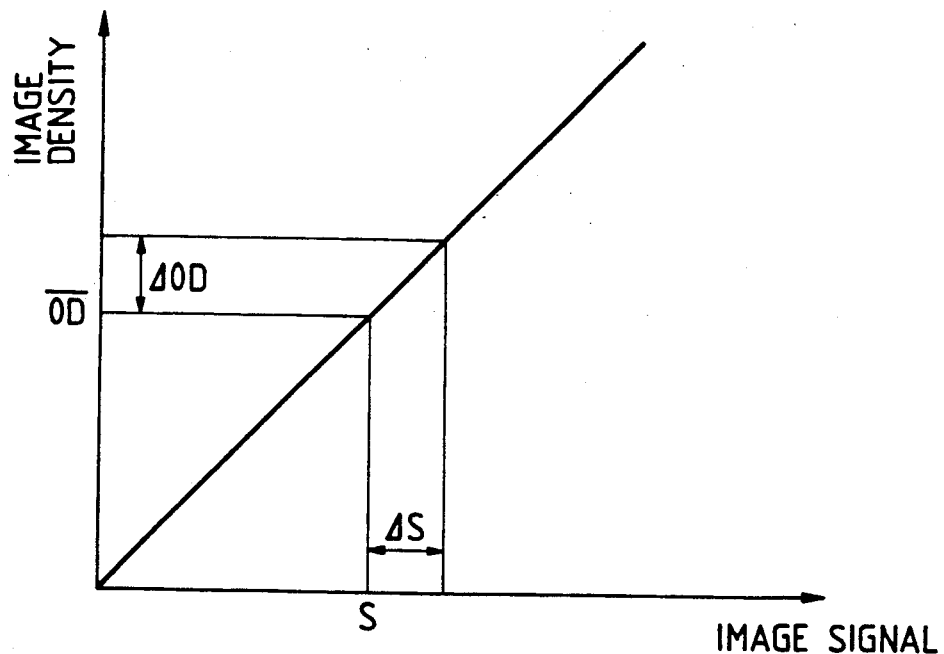
Figure 13:
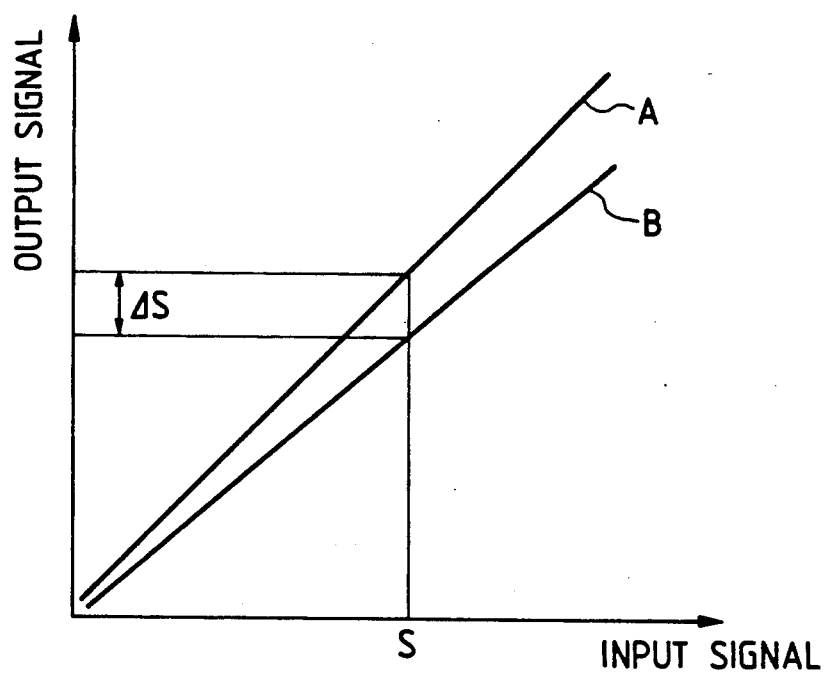

In this case, if the relationship between an image signal value and an output density, i.e., gradation characteristics are represented by the relationship shown in FIG. 12, when a density is to be corrected by $\Delta OD_n$, an image signal need only be corrected by $\Delta S$. For this purpose, the image signal can undergo table conversion, as shown in FIG. 13. In FIG. 13, a line A has an inclination of 1.0, and with this line, an input is not converted at all. On the other hand, a line B has an inclination of $(S - \Delta S)/S$, and when a value S is input, an output becomes $S - \Delta S$.

Therefore, the head can be driven after an image signal corresponding to an nth nozzle undergoes the table conversion as represented by the line B in FIG. 13, so that the density of a portion printed by this nozzle becomes equal to $\overline{OD}$. When such processing is performed for all the discharging orifices, density nonuniformity can be corrected, and a uniform image can be obtained. In other words, data representing relationships between image signals corresponding to the respective nozzles and table conversion need only be obtained in advance, thus allowing nonuniformity correction.

This correction may be performed by comparing densities in units of nozzle groups (each including three to five nozzles) as approximate uniforming processing.

With this method, density nonuniformity can be corrected. Thereafter, density nonuniformity may occur again depending on a use state of the apparatus or an environmental change, a change in density nonuniformity itself before correction, or a change in correction circuit over time. In order to cope with such a situation, a correction amount of an input signal must be changed. As a cause of the density nonuniformity, it can be considered that a deposit from an ink or a foreign matter becomes attached to a portion near ink discharging orifices, and the density distribution is changed. This can also be predicted from the fact that the density distribution is often changed by degradation or deterioration of heaters in a thermal head. In this case, since correction cannot be sufficiently performed by an input correction amount set in an early stage, e.g., during the manufacture, density nonuniformity gradually becomes conspicuous as the heads are used. Therefore, it is effective to perform the following processing.

Figure 14A:
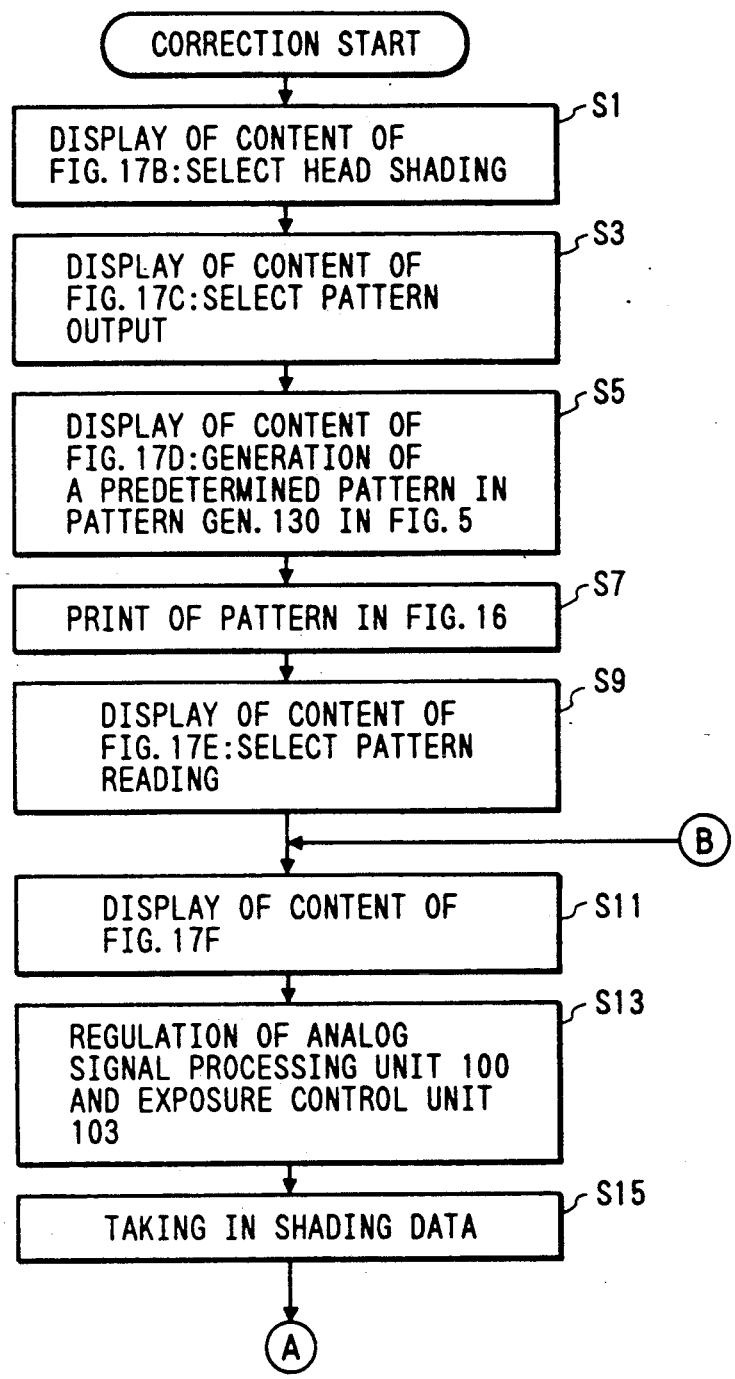
FIGS. 14A to 14C are flow charts showing a nonuniformity correction sequence.
Figures 14B, 14C:
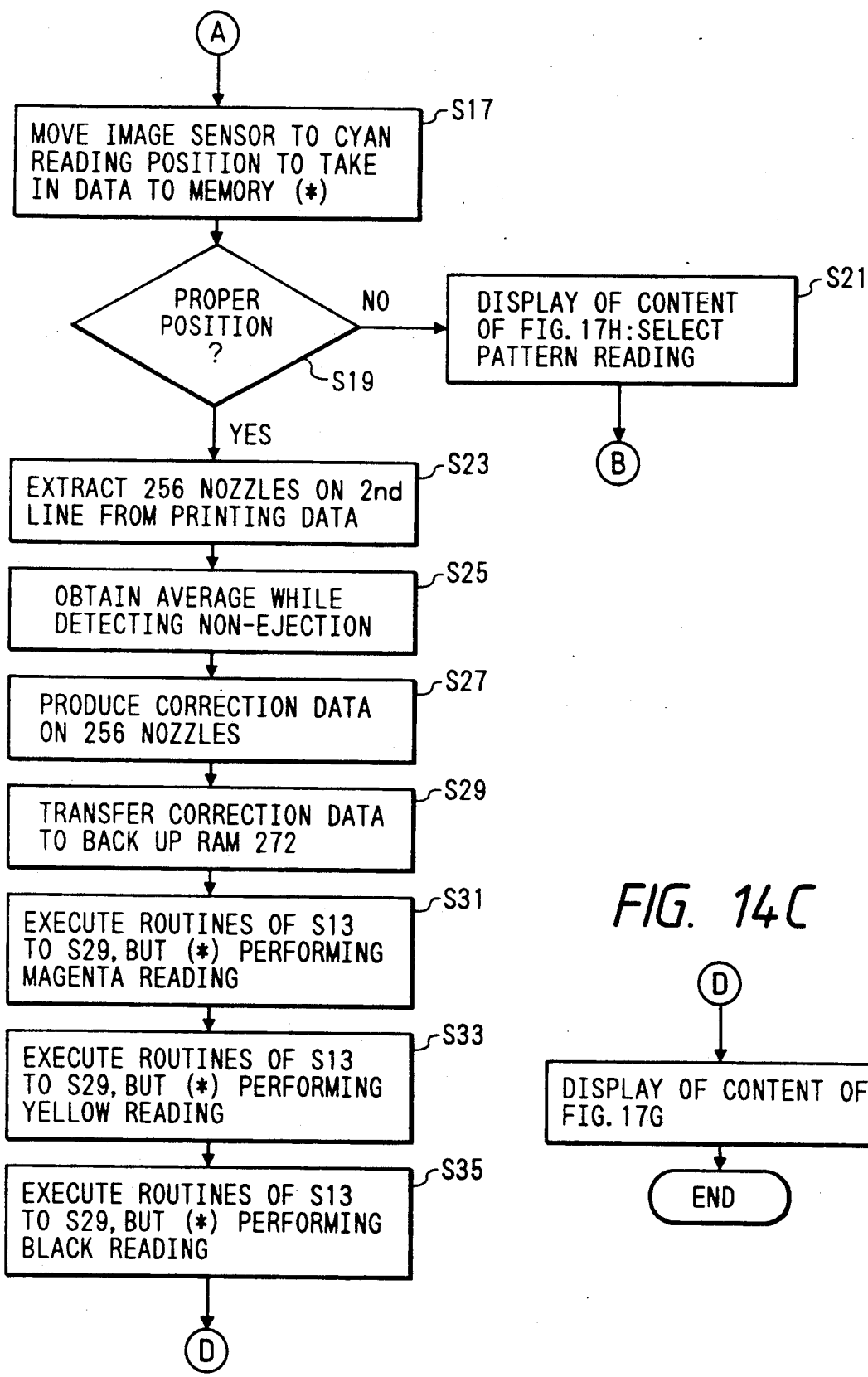
Figure 15A:
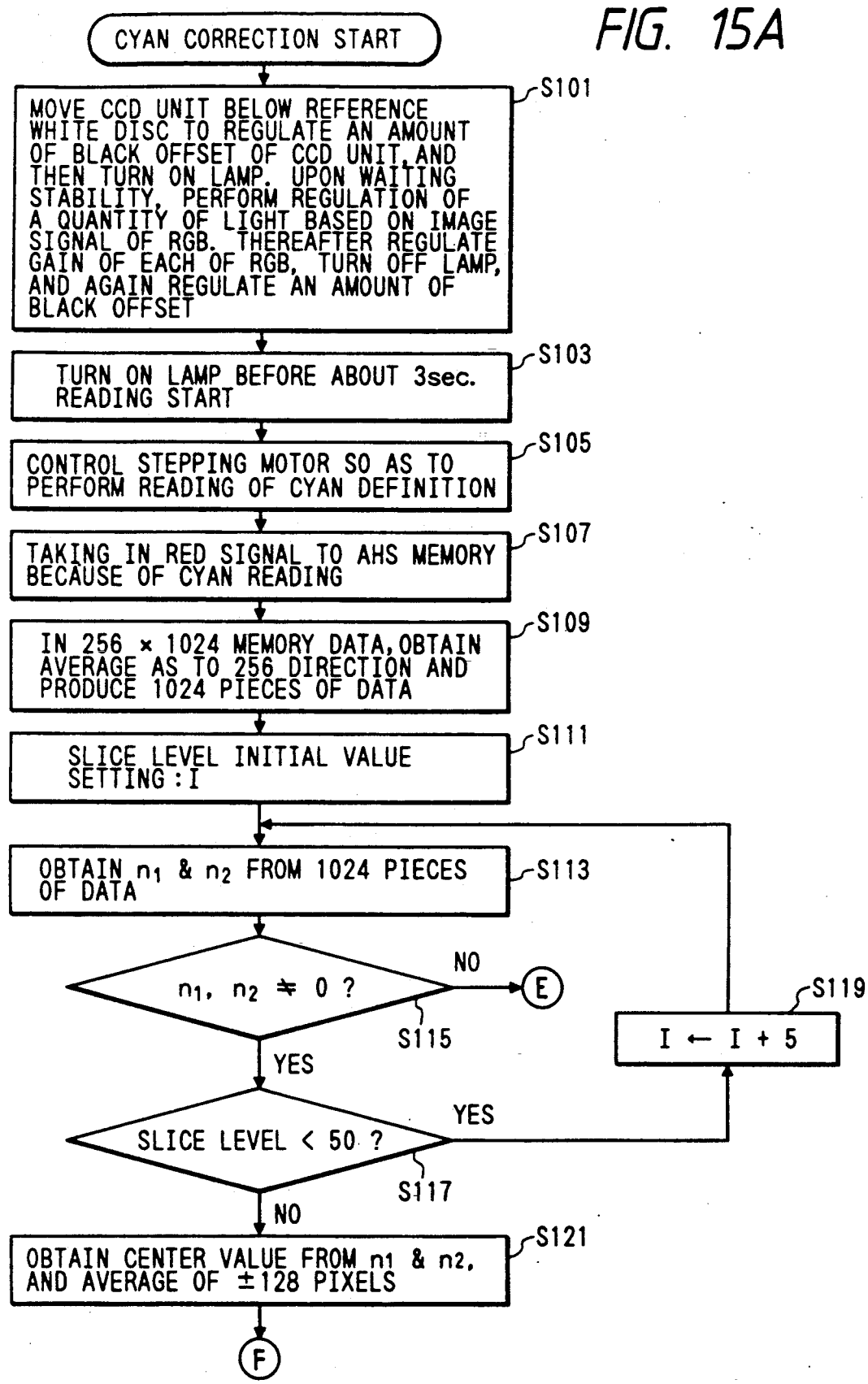
FIGS. 15A to 15C are flow charts showing in detail a portion of the sequence shown in FIGS. 14A to 14C.
Figure 15B:
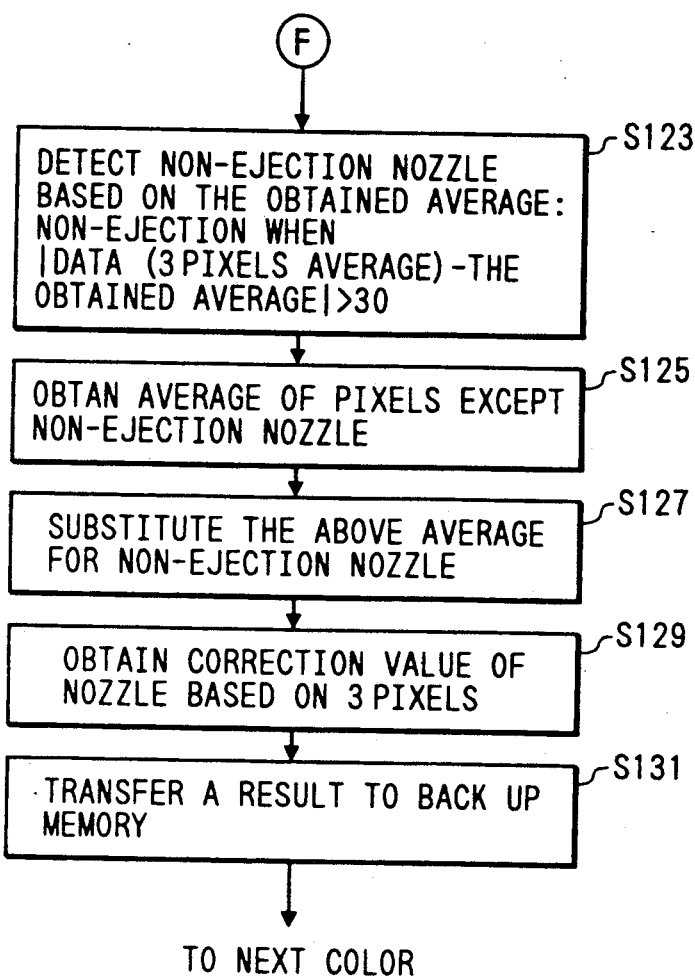
Figure 15C:
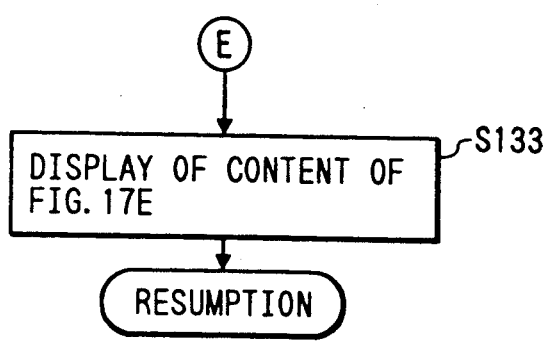

FIGS. 14A to 14C show a nonuniformity correction processing sequence according to this embodiment, FIGS. 15A to 15C show in detail a portion of the sequence shown in FIGS. 14A to 14C, FIG. 16 shows a correction pattern (test pattern) of this embodiment, and FIGS. 17A to 17H show display examples on the console which is of touch panel type integrated with a liquid crystal display unit.

Figure 17A:
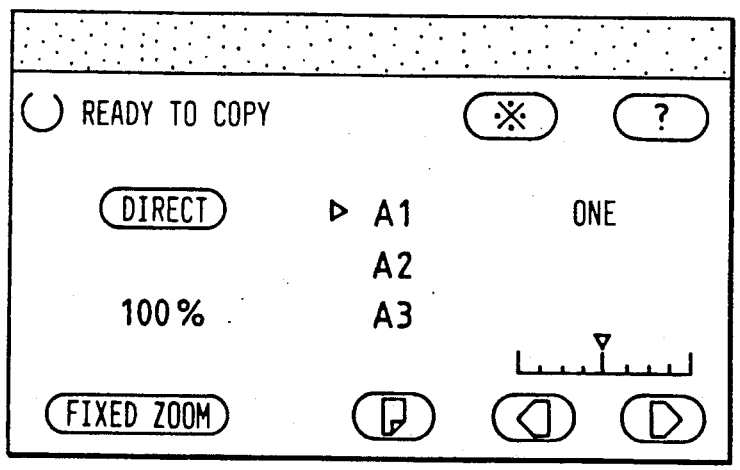
FIGS. 17A to 17H are explanatory views of states of a console in the sequence.

In the embodiment of the present invention, the operations can be roughly classified as follows:
1) correction pattern output operation
2) correction pattern read operation
3) read data processing FIG. 17A shows a state wherein a normal copying operation is allowed. From this state, an HS operation shown in FIGS. 14A to 14C can be performed.

Figure 17B:
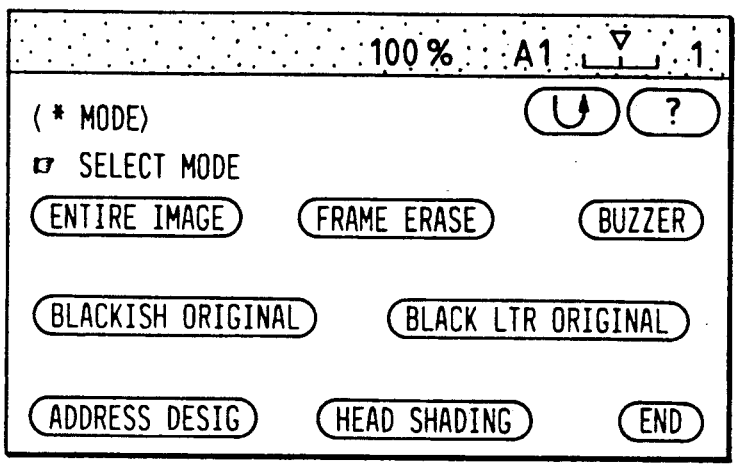
Figure 17C:
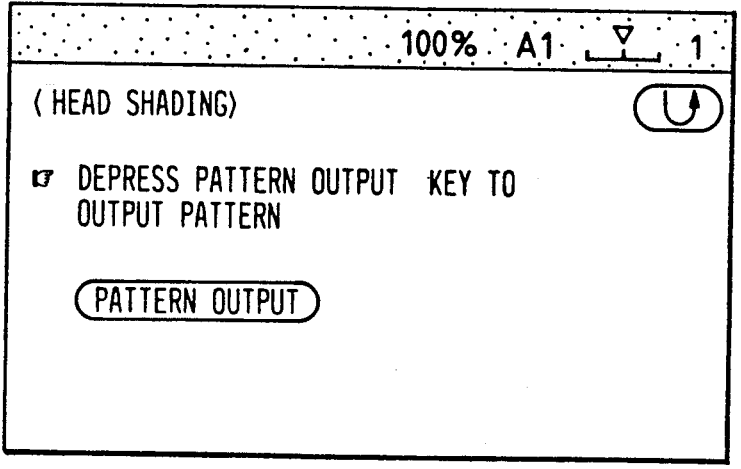
Figure 17D:
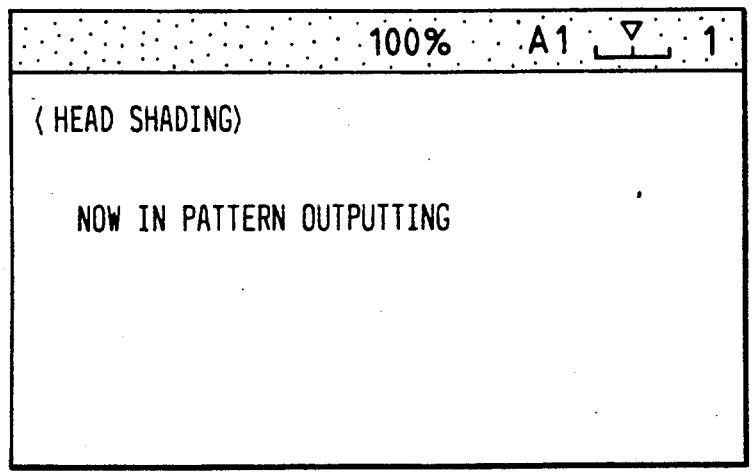

When an * key on the console is depressed, the sequence shown in FIG. 14A is started, and in step S1, screen data shown in FIG. 17B is displayed. When HEAD SHADING is depressed, the control enters a mode of this embodiment, and in step S3, screen data shown in FIG. 17C is displayed. In order to output a correction pattern, PATTERN OUTPUT in FIG. 17C is depressed, so that a predetermined pattern is printed out in accordance with a logic to be described later. During the print-out operation, screen data shown in FIG. 17D is displayed on the console, thus informing to an operator that the pattern is being printed out.

Figure 18:
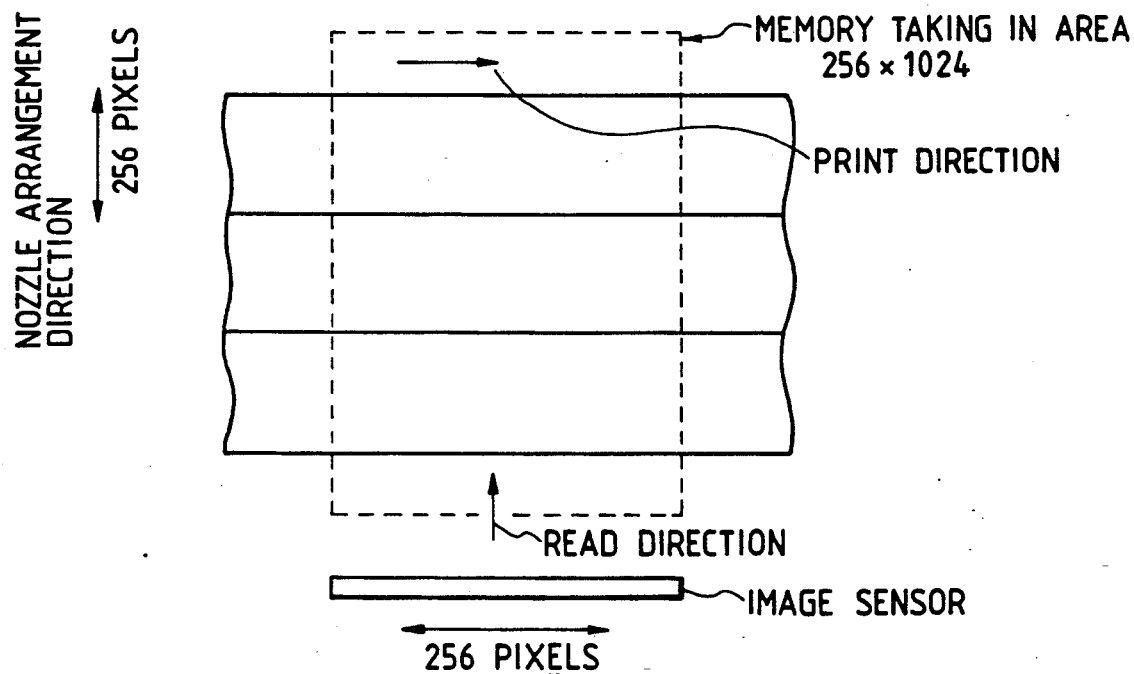
FIG. 18 is an explanatory view of a reading area to be stored in a memory on a test pattern.

In the print-out operation, a digital pattern signal having level L is generated by a pattern generator 130 shown in FIG. 5. The pattern signal is input to the input image processing unit 101, and is then sent to the recording heads 117, 118, 119, and 120 via the image processing unit 107 and the binarizing processing unit 108, thereby recording a recording pattern having a predetermined recording density $D_H$ corresponding to the input image signal L on a recording sheet, as shown in FIG. 18.

In this embodiment, the level L corresponds to a 50%-duty signal, and is directly sent to the binarizing processing unit without being subjected to masking processing, UCR processing, and $\gamma$/offset processing in the image processing unit.

FIG. 16 shows a test pattern to be printed in this embodiment. A cyan pattern is printed on a recording sheet 29 for three scanning lines, and thereafter, magenta, yellow, and black halftone patterns (duty=50%) are then printed to have intervals of one scanning line therebetween (step S7).

With the above-mentioned processing, the correction pattern output operation is completed.

Figure 19:
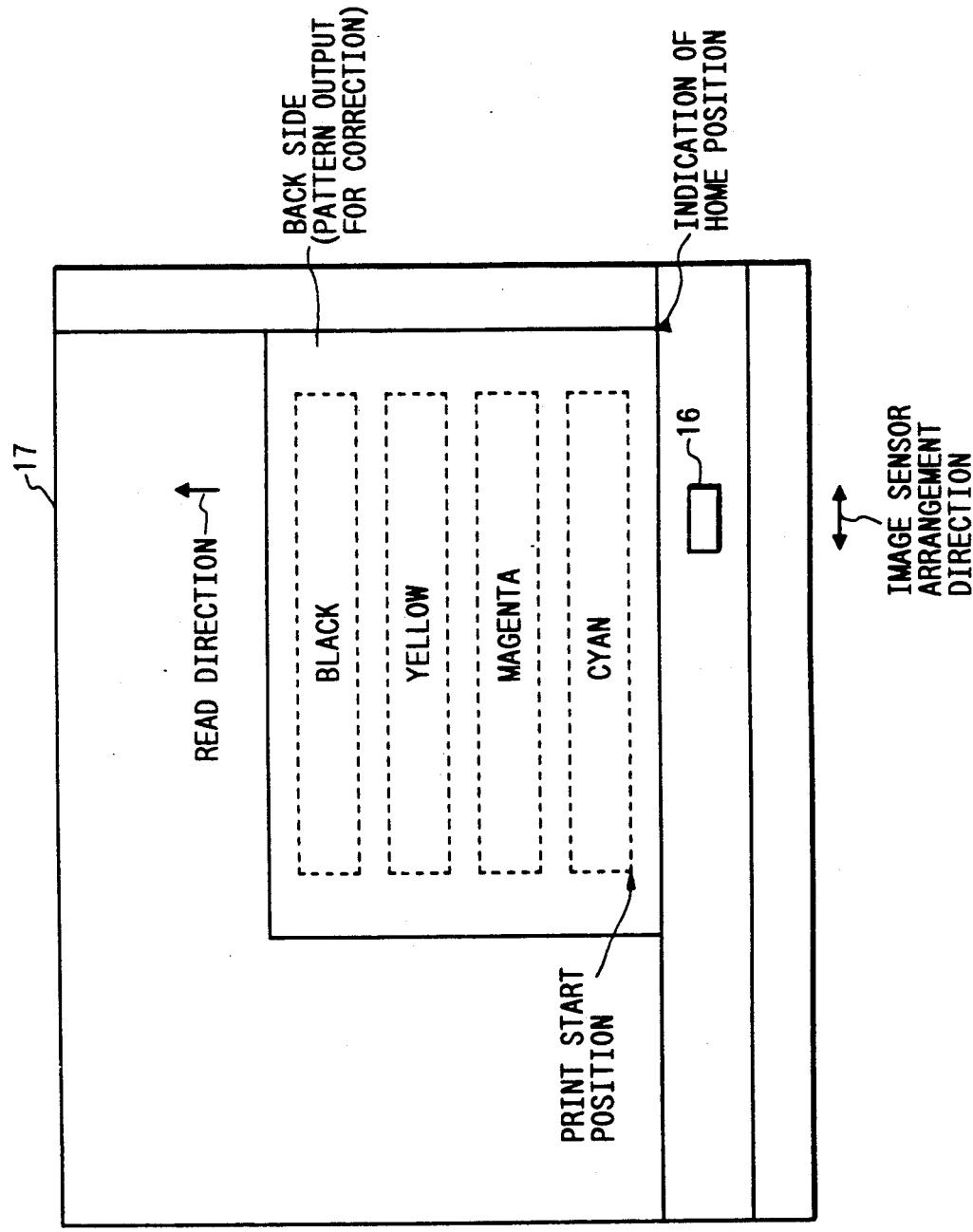
FIG. 19 is an explanatory view of a test pattern placed on a scanner.

Then, the printed correction pattern read operation is started. Upon completion of the correction pattern output operation, screen data on the console is changed to that shown in FIG. 17E (step S9). An operator places the sheet printed with the correction pattern at a predetermined position on the original table glass 17 in accordance with an instruction displayed on the console, and then depresses PATTERN READING. In this manner, the control enters the correction pattern read operation 2) above. In this case, the sheet is placed on the original table glass 17, so that the cyan pattern of the cyan, magenta, yellow, and black patterns in the order named is located near the operator. This state is as shown in FIG. 19. The reason for this is that the printed patterns are placed to be parallel to the alignment direction of the image sensor as precise as possible in order to precisely read the printed patterns as much as possible. Even when the sheet is placed obliquely, the patterns can be read precisely to some extent. However, in order to more precisely read the patterns, the position of the sheet is regulated.

Figure 17E:
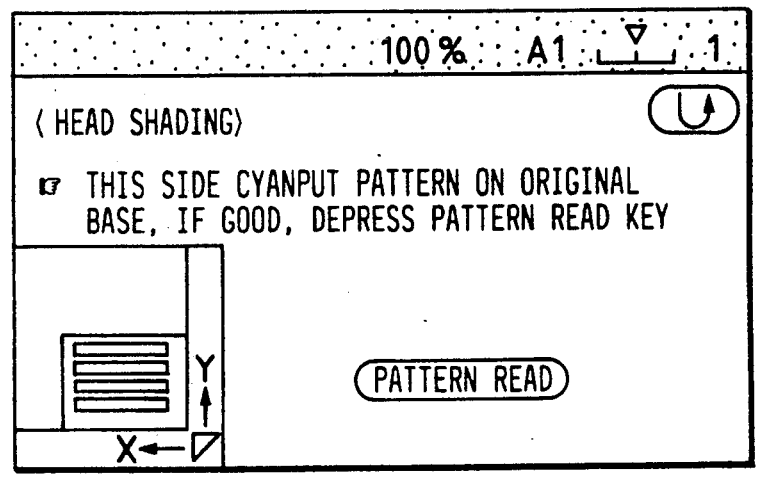
Figure 17F:
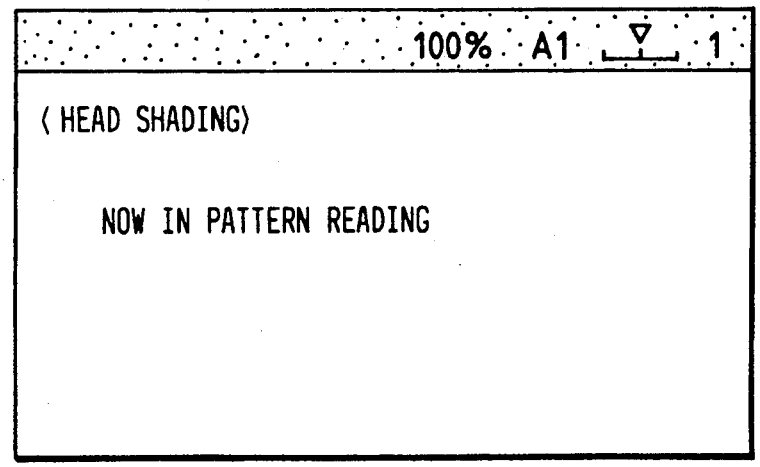

During the read operation, screen data shown in FIG. 17F is displayed on the console, thus informing to the operator that the patterns are being read.

During the read operation, in order to adjust the analog signal processing unit 100 and the exposure control unit 103 for the image sensor 16, and to sample shading correction data, the image sensor 16 is moved to a reference white plate (not shown) arranged on the original table glass 17. An initial value is substituted in the analog signal processing unit 100 so as to adjust a light amount, and an exposure amount is adjusted by the control unit 102 (step S13). In the analog signal processing unit, after an amplification amount is finely adjusted by the control unit 102, shading data is fetched, and the shading correction operation of the image sensor 16 is completed (step S15). This function is included in the input image processing unit 101. In this manner, the read operation can be normally performed. The operations in steps S13 and S15 are shown in detail as step S101 in FIG. 15A.

In order to read the cyan pattern, the image sensor 16 is moved to a predetermined position. Prior to reading, step S103 in FIG. 15A is executed, so that the read operation is started after light emission of the lamp is stabilized. The reading direction of the image sensor 16 is controlled so that a 1-line reading speed by the image sensor 16 corresponds to one dot of the nozzle (corresponding to step S105 in FIG. 15A). This means that 1-line data by the image sensor 16 corresponds to one dot of the discharging orifice. The data read in this manner is stored in the HS memory 123 via the analog signal processing unit 100, the input image processing unit 101, and the image processing unit 107 (step S17 in FIG. 14B).

The scanner having the image sensor 16 according to this embodiment can be desirably moved below the original table, and fetches a 256×1,024 area (FIG. 18) on the trailing edge portion of the printed sheet in the memory. In the fetching operation, since processing associated with the cyan pattern is to be performed, a RED signal of the CCD as the complementary color of cyan is fetched (step S107 in FIG. 15A). For magenta, yellow, and black, green, blue, and red signals are respectively used.

It is checked in step S19 in FIG. 14B if the printed correction pattern is correctly placed. More specifically, this can be confirmed by executing processing operations in steps S111 to S119 after averages in the discharging orifice alignment direction are obtained using 256×1,024 data to obtain 1,024 data in step S109 in FIG. 15A.

An error can be determined as follows.

FIG. 20 shows a case wherein the printed correction pattern is correctly placed, and is normally fetched in a memory. In FIG. 20, the start position of the printed portion is indicated by $n_1$, and the end position of the printed portion is indicated by $n_2$. The positions $n_1$ and $n_2$ are obtained in correspondence with slice levels which are changed by 10 steps between 5 to 50 in units of 5 like 5, 10, 15, ..., 50 with respect to density data.

Figure 21:
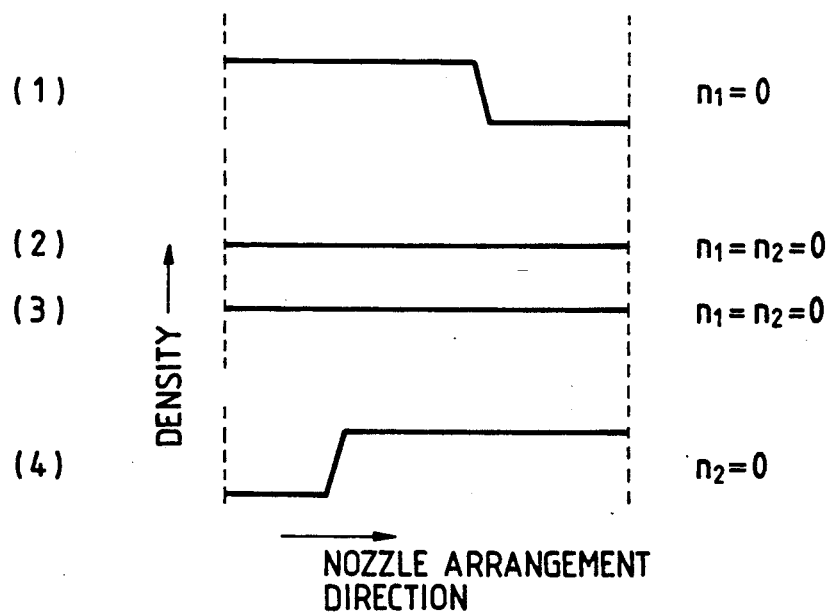

An error is determined under the four conditions, as shown in FIGS. 21(1) to 21(4). FIG. 21(1) shows a case wherein the start position $n_1$ of the printed portion cannot be detected, i.e., when the pattern is located too close to the operator side. FIG. 21(2) shows a case wherein neither the start position $n_1$ nor the end position $n_2$ of the printed portion can be detected, and the density is minimum, i.e., when blank paper is located at the predetermined position, e.g., when no pattern is placed. FIG. 21(3) shows a case wherein neither the start position $n_1$ nor the end position $n_2$ of the printed portion can be detected, and the density is maximum, i.e., when the density pattern is placed to be offset by 90°. FIG. 21(4) shows a case wherein the end position $n_2$ of the printed portion cannot be detected, i.e., when the pattern is placed too far from the operator side contrary to FIG. 21(1). The image sensor 16 is a color sensor, and can discriminate colors. In addition, data output from filters of the image sensor corresponding to the respective colors can also be used, as a matter of course.

Figure 17G:
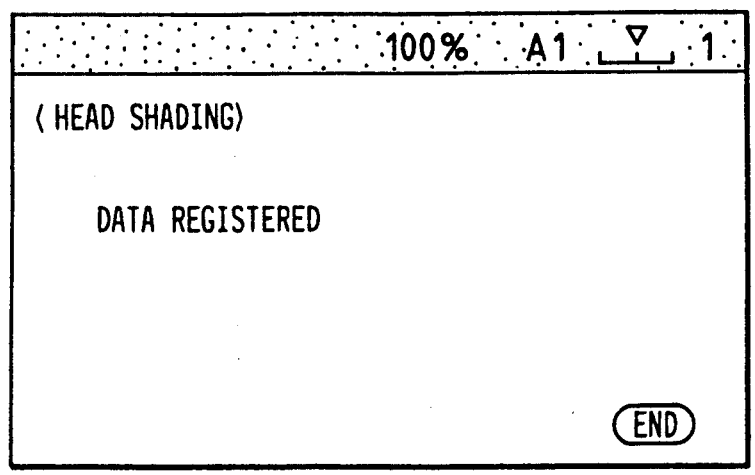
Figure 17H:
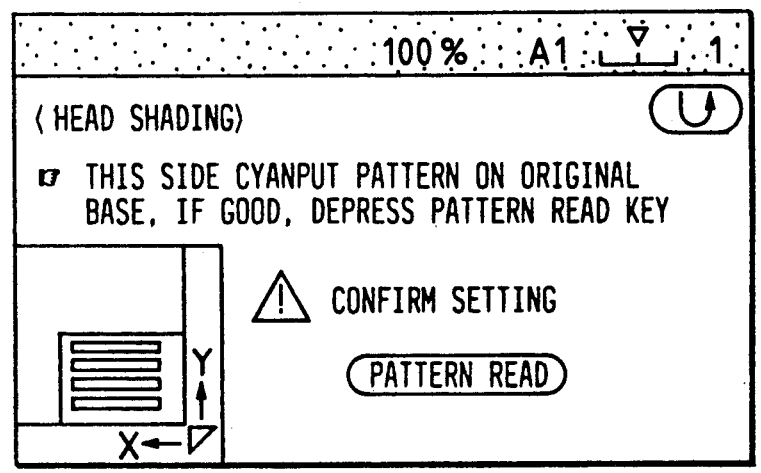

When an error is detected in the above-mentioned processing, screen data shown in FIG. 17H is displayed in step S21 in FIG. 14B, or screen data shown in FIG. 17E is displayed by processing in step S133 in FIG. 15C.

In this manner, when a cyan pattern is read, a red signal of color signals output from the image sensor is used. Since red is the complementary color of cyan, and a red output signal is increased, a good image signal can be obtained. When an image to be read is in another color in the read mode, since the red signal value is different, the positions $n_1$ and $n_2$ cause an error between slice levels 5 to 50. As a result, an error can be detected when a pattern is erroneously placed, e.g., when another color is placed.

Similarly, in a magenta read mode, a green signal can be used, in a yellow read mode, a blue signal can be used, and in a black read mode, a red signal can be used.

In this manner, after it is confirmed that data is normally stored in the HS memory 123, in this embodiment, since a pattern of three lines is printed, as shown in FIG. 18, data for 256 nozzles in the second line are extracted in step S23 in FIG. 14B.

At this time, like in step S121 in FIG. 15A, the start and end points are respectively calculated based on averages of 10 $n_1$ and 10 $n_2$ used in the error check mode, and the center of the three lines is then calculated. The center ±128 nozzles correspond to the 256 nozzles of the second line. In this manner, when the pattern data in the second line which is free from the influence of edge portions of the test pattern is used, nonuniformity can be precisely read and corrected.

In an ink-jet recording head having a plurality of nozzles, some discharging orifices suffer from a discharging disabled state or are contaminated considerably, and ink droplets cannot often be printed at predetermined positions. When density correction is simply performed for this head, densities on two sides of a non-printing portion are undesirably increased, and a normal correction operation is disturbed.

A countermeasure algorithm against a discharging error state such as a discharging disabled state will be described below (step S25 in FIG. 14B; more specifically, steps S123 to S131 in FIG. 15B).

A calculation method will be described in detail below.

Image data stored in an image memory consists of 256×1,024 pixel data S(i,j), and each pixel data has an 8-bit value (0 to 255).

Since the pixel data S(i,j) are luminance data read from the CCD, they are converted into density data dd(i,j) by a table created according to the following equation:

$$dd(i,j) = -\frac{255}{\alpha} \log(S(i,j)/255)$$

where $\alpha$ is the maximum density value of an ink.

The data dd(i,j) are added and averaged for i, and are converted into dn(j).

$$dn(j) = \frac{1}{256} \sum_{i=1}^{256} dd(i,j)$$

In a printed pattern, when addition and averaging are performed in a direction i corresponding to the subscanning direction of the printing operation, the density data dn(j) reflecting density characteristics of the nozzles can be obtained. Since the density data dn(j) are obtained by reading data printed by the head during three scanning operations, the positions of the nozzles are specified based on these data. The data dn(j) are sliced at a plurality of levels (10, 20, 30, 40, 50, and 60; FIG. 20), and pixels which initially exceed the slice levels when viewed from the leading edge of the image data are respectively represented by $a_1$, $a_2$, $a_3$, $a_4$, $a_5$, and $a_6$. Similarly, pixels which initially exceed the slice levels when viewed from the trailing edge of the image data are respectively represented by $b_1$, $b_2$, $b_3$, $b_4$, $b_5$, and $b_6$.

A middle value mid is calculated according to the following equation using these data:

$$mid = \left( \frac{a_1 + b_1}{2} + \frac{a_2 + b_2}{2} + \frac{a_3 + b_3}{2} + \frac{a_4 + b_4}{2} + \frac{a_5 + b_5}{2} + \frac{a_6 + b_6}{2} \right)/6$$

With reference to this middle value mid, the nozzle positions are specified. That is, start=mid−128.

Thereafter, non-discharging nozzles are detected. First, the average value of densities of all the 256 nozzles is calculated:

$$dck = \frac{1}{256} \sum_{k=1}^{256} dn(k + \text{start})$$

The non-discharging nozzles are detected according to the condition given by the following equation using the average value dck.

$$\{dn(k+start-1)+dn(k+start)+dn(k+start+1)\}/3 < dck-30$$

If this condition is satisfied, the kth nozzle is determined as the non-discharging nozzle, and 0 is substituted in a discrimination signal ck(k). Otherwise, it is determined that the kth nozzle is not a non-discharging nozzle, and 1 is substituted in ck(k). The number ns of nozzles which are not non-discharging nozzles is calculated as follows:

$$ns = \sum_{k=1}^{256} ck(k)$$

Using this ns, the average value of the densities of the nozzles which are not non-discharging nozzles is calculated as follows:

$$dsh = \frac{1}{ns} \sum_{k=1}^{256} dn(k + \text{start}) \cdot ck(k)$$

The average value is substituted in the nozzle which is determined as the non-discharging nozzle.

If $ck(k)=0$, $dn(k+start)=dsh$

With the above-mentioned processing, the non-discharging nozzle data can be prevented from adversely influencing other nozzle data.

Then, three pixels are smoothed to finally determine nozzle densities.

$$ds(k)=\{dn(k+start-1)+dn(k+start)+dn(k+start+1)\}/3$$

This smoothing is performed to eliminate, e.g., a positional error in reading. Density correction values rd(k) are calculated on the basis of data ds(k) corresponding to the nozzle densities.

$$rd(k)=100-\{100\times ds(k)/dsh\}+rd(k)$$

More specifically, the density of each nozzle with respect to the average density dsh of the nozzles which are not non-discharging nozzles is expressed by a percentage, and a corresponding correction amount is determined according to the percentage.

rd(k) is the correction value of each nozzle when previous correction was performed. The value rd(k) is rewritten with the previous data every time the correction is performed.

The correction data calculated by the above-mentioned algorithm are transferred from the HS memory 123 to the backup RAM 272 shown in FIG. 9.

On the basis of these data, nonuniformity correction data are generated in step S27 in FIG. 14B. More specifically, signals corresponding in number to the discharging orifices are sampled from a signal obtained by reading density nonuniformity, and are determined as data corresponding to the discharging orifices If these data are represented by $R_1, R_2, \ldots, R_N$ (N=the number of discharging orifices), they are temporarily stored in a memory, and are then subjected to the following calculations.

These data are converted into density signals as follows:

$$C_n = -\log(R_n/R_0)$$

($R_0$ is a constant satisfying $R_0 \geq R_n$; $1 \leq n \leq N$)
Then, an average density is calculated by:

$$C = \sum_{n=1}^{N} C_n/N$$

An offset of a density corresponding to each discharging orifice from the average density is calculated as follows:

$$\Delta C_n = \overline{C}/C_n$$

Then, a signal correction value $(\Delta S)_n$ according to $(\Delta C)_n$ is calculated by:

$$\Delta S_n = A \times \Delta C_n$$

where A is a coefficient determined by gradation characteristics of the head.

Subsequently, a selection signal of a correction line to be selected is obtained in accordance with $\Delta S_n$ (step S27), and correction signals having values shown in FIG. 10, and corresponding in number to the discharging orifices are stored in the backup RAM 272. The different correction lines in units of discharging orifices are selected on the basis of the correction data generated in this manner. Thus, the density nonuniformity can be corrected, and correction data can be rewritten.

The same processing is repeated in the order of magenta, yellow, and black (steps S31 to S35). In these operations, screen data shown in FIG. 17F is displayed, thus informing to an operator that a pattern is being read. Upon completion of a correction operation of a block, screen data shown in FIG. 17G is displayed, thus informing to the operator that the correction operation is completed. The operator then depresses END, and this mode is completed. Thereafter, the screen data shown in FIG. 17A is displayed again.

The above-mentioned operations are performed when data are printed on the normal roll paper. The apparatus of this embodiment can print data on transparent type roll medium (back print film), and has a mode for completing a picture when a printing result is viewed from the back side with respect to a printed surface (to be referred to as a BPF mode hereinafter). In this mode, a mirror image is printed, and is viewed from the back side with respect to the printed surface.

At this time, the nonuniformity of the head appears on the back surface. For this reason, correction data must be sampled from the back surface. Furthermore, $\gamma$ used in printing on normal roll paper is not used since a medium of a different type is used, and the printing operation is performed through the $\gamma$/offset unit. A difference upon reading an image from the back surface will be explained below.

Figure 22:
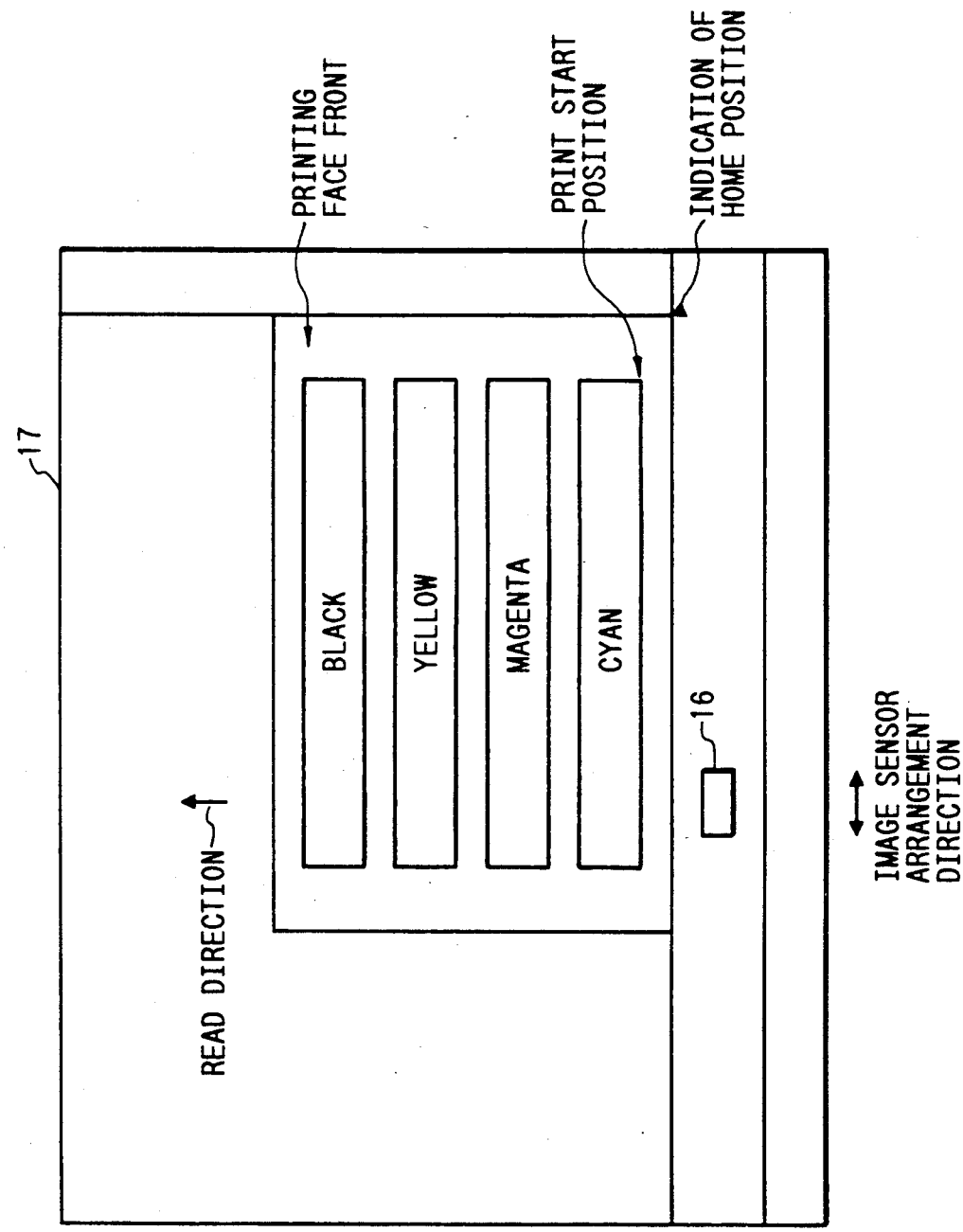
FIG. 22 is an explanatory view showing a state of a test pattern on the scanner unit when another type of recording medium is used.

FIG. 22 shows a state wherein a pattern printed in the BPF mode is placed on the original table glass 17. Since data on the back surface is to be read, the printed surface faces up, and this state corresponds to a 180°-rotated state of FIG. 19. In this state, the printing start position is located on the home position side. In order to read data at a position where a stable printing operation is performed, data are sampled at the position of the image sensor 16 shown in FIG. 22, which position is far from the home position unlike the normal roll paper. The same processing except for the above-mentioned operations is performed. This mode is automatically switched by detecting a transparent type roll medium.

As described above, according to this embodiment, a test pattern of three lines is printed, and the second line (middle line) is used for reading density nonuniformity. Therefore, the influence of a recording medium outside the edge portions of the test pattern can be eliminated. In addition, the density nonuniformity can be precisely corrected, and quality of a recorded image can be improved.

Since the density nonuniformity of a test pattern is read using a scanner for reading an original image in a copying machine, another scanner need not be arranged, and an increase in cost can be prevented.

In this case, since a density nonuniformity correction sequence is guided on a display panel for a user or a serviceman, the user or serviceman can easily and precisely perform operations.

Second Embodiment

The second embodiment of the present invention will be described below.

In the first embodiment, nonuniformity correction data for four colors, i.e., cyan, magenta, yellow, and black are corrected at a time.

However, regeneration of correction data is not always required for all the four heads. In general, data for one or two heads need only be regenerated.

In the second embodiment, a head whose data is to be written can be designated.

Figure 23:
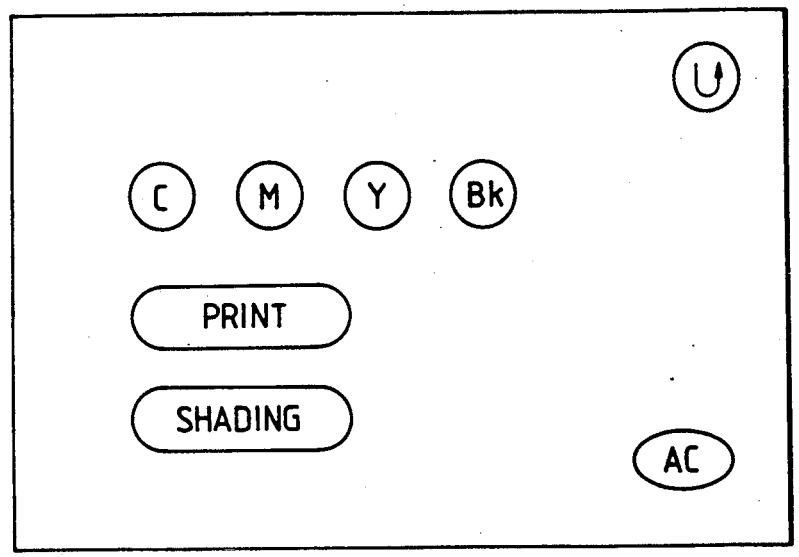
FIG. 23 is an explanatory view of a state of a console according to another embodiment of the present invention.

FIG. 23 shows a liquid crystal touch panel of this embodiment.

First, a head for which data is to be rewritten is designated. For example, when data for the cyan head is to be rewritten, ⓒ is depressed.

Then, PRINT is depressed. A test print obtained by printing a cyan 50% halftone pattern for three scanning lines is output.

Subsequently, the test print is placed on the original table glass 17 like in the first embodiment, and SHADING is depressed. The same data reading operations and calculations as in the first embodiment are executed, and new data is set. The same applies to the heads other than the cyan head.

Upon completion of the data rewriting operation ⓙ is depressed, and the control returns to the normal mode. When all the data are to be cleared, AC is depressed.

In this manner, since a head whose data is rewritten can be selected, operations can be performed within a short period of time in addition to the effects described in the first embodiment.

Third Embodiment

This embodiment has a function of manually changing a correction table selection value by an operator in addition to the apparatus for reading a pattern using a reader and automatically switching a correction table value of a head.

Figure 24:
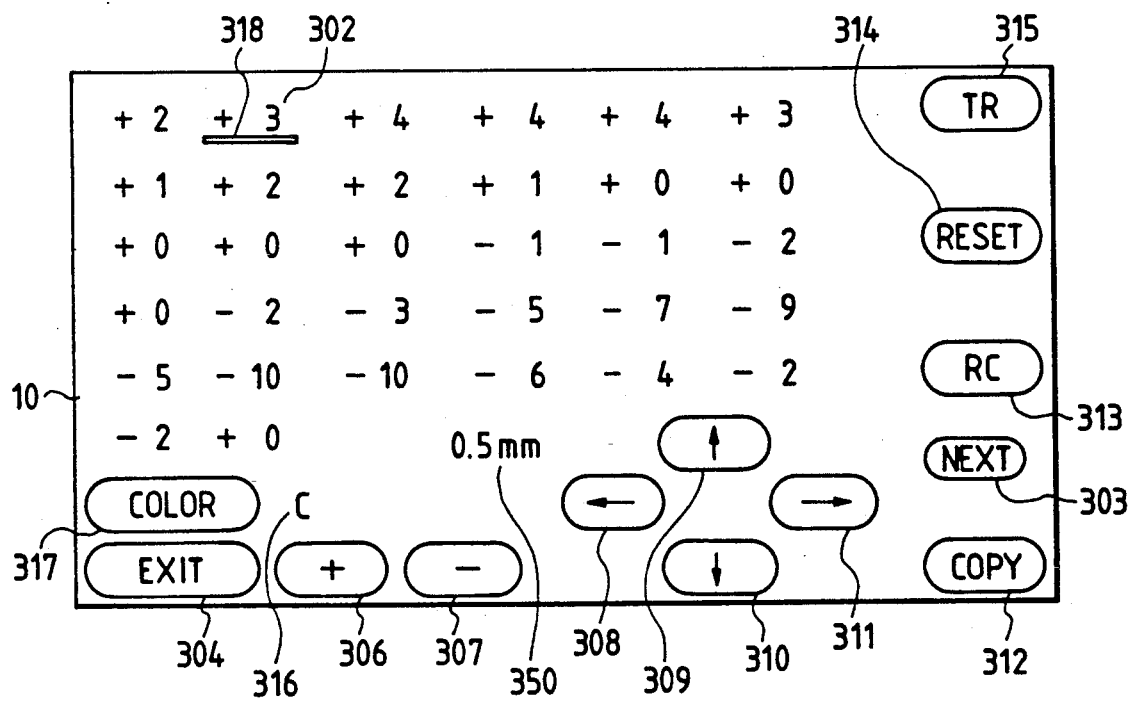
FIG. 24 is an explanatory view of a state of a console according to still another embodiment of the present invention.

When the control enters a characteristic change mode upon depression of the HEAD SHADING switch shown in FIG. 17B in the console 10, screen data shown in FIG. 24 is displayed on a liquid crystal touch panel in the console. In FIG. 24, the type of color of a head to be subjected to a characteristic change operation is indicated by 316, and present correction data is indicated by 302. As shown in FIG. 24, since correction data for 32 nozzles out of 256 nozzles per color are displayed on the screen, nozzles to be corrected can be selected in units of 32 nozzles by a next page key 303 or a previous page key 304, or a head for a color to be displayed can be selected by a color selection key 317. Such control is made by the control unit 111.

Note that 256 nozzles per head may be divided into 32 blocks in units of 8 nozzles, and correction data may be changed in units of blocks in place of changing the correction data in units of nozzles. When the correction data are changed in units of blocks, a sufficient correction effect can be obtained, and a changing operation can be simplified.

When correction data 302 displayed, as shown in FIG. 24, is to be corrected in correspondence with characteristics, a page on which a nozzle to be corrected is displayed is selected using the next page key 303, the previous page key 304, and the color selection key 317. A cursor 318 is moved to a position where the correction data corresponding to the nozzle of the head to be corrected is displayed using cursor keys 308 to 311. Then, an up or down key 306 or 307 is turned on to increment/decrement a correction table value corresponding to the cursor 318.

Figure 25:
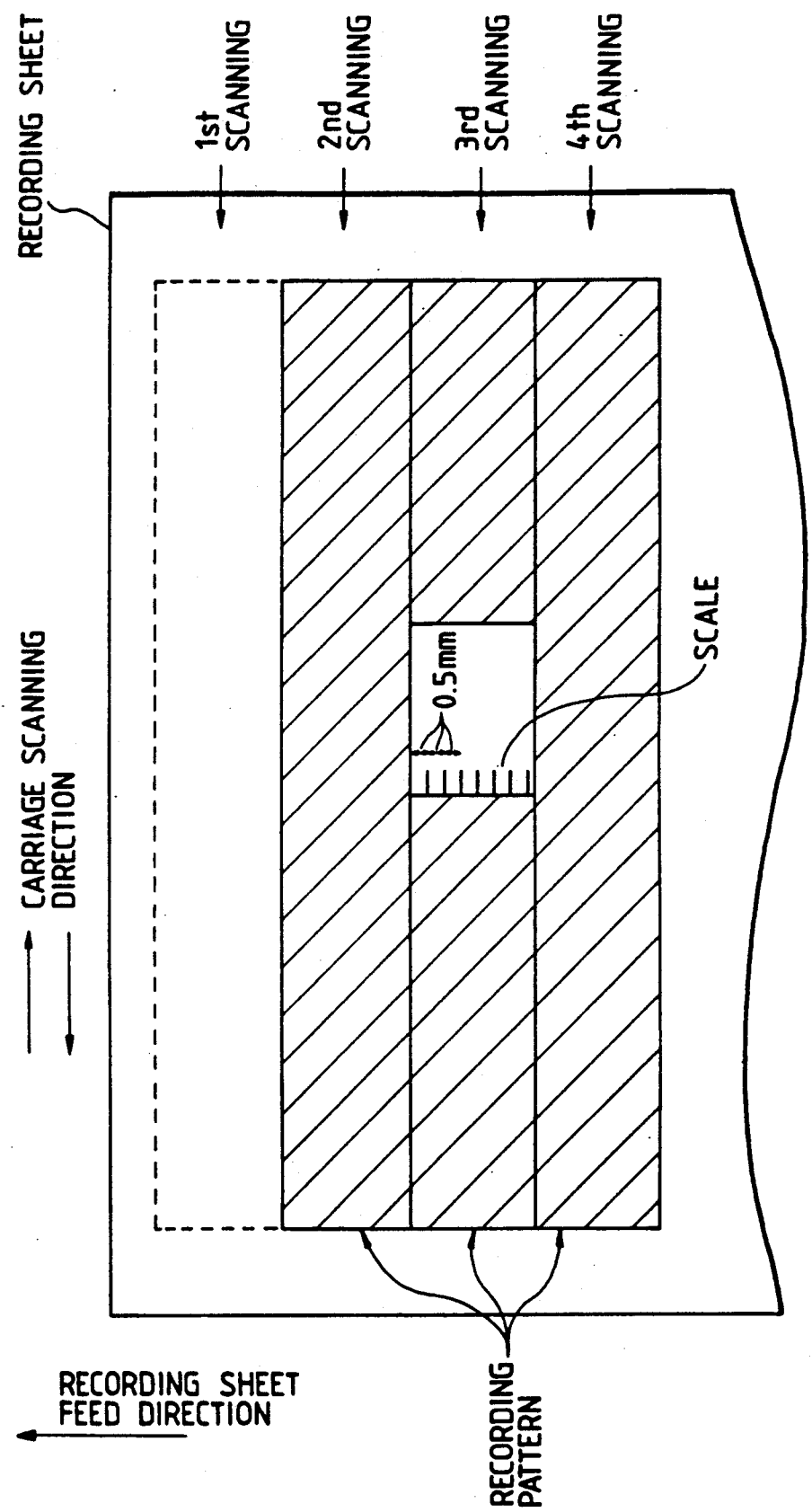
FIG. 25 is an explanatory view showing a test pattern in the embodiment shown in FIG. 24.
Figure 26A:
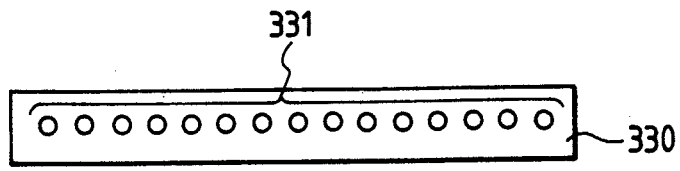
FIGS. 26A to 26E are explanatory views for explaining conventional density nonuniformity correction in a multi-nozzle head.
Figure 26B:
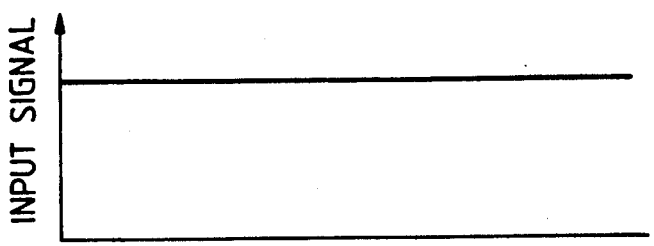
Figure 26C:
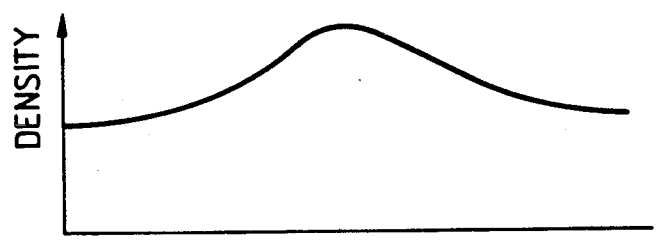
Figure 26D:
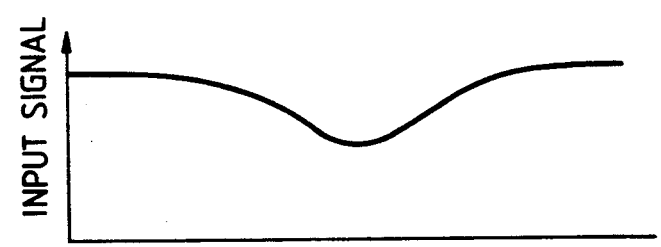
Figure 26E:
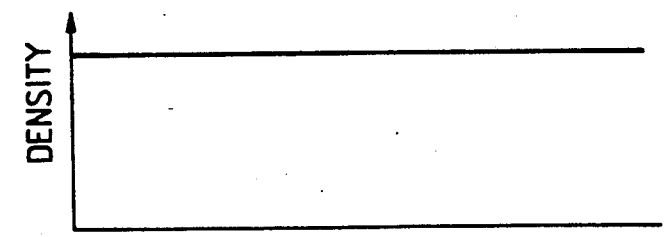

When an operator turns on a copy start key 312 upon completion of required changing operations, a pattern signal is generated from the pattern generator 130, and is recorded by a corresponding one of the recording heads 117 to 120, as shown in, e.g., FIG. 25. On the basis of this recording state, the operator determines if another changing operation is required. If another changing operation is required, the operator repeats the above-mentioned operations to change correction data to appropriate values. If the operator determines that no changing operation is required, he or she depresses a registration key 315.

The CPU 258 (FIG. 9) registers the correction data in the backup RAM 272 (FIG. 9) in accordance with the above-mentioned operations. The changed correction data value is added to data corrected using data read from the reader in the first embodiment.

In the first embodiment, since a test pattern has a predetermined density, correction values often slightly vary depending on the density of an original to be copied in practice. However, since correction data can be manually adjusted like in this embodiment, a copying operation of a unique original can be coped with.

The correction data rewriting operation described above may be performed by a user or a serviceman on the market, but may be performed during the manufacture of products in a factory, and the products may be delivered in a nonuniformity free state.

Furthermore, in the above embodiment, a 3-line pattern is printed, and the second line is subjected to nonuniformity reading. For the purpose of eliminating the influence of other portions of a recording medium outside pattern edge portions, and performing precise reading, the size of a margin other than a portion to be subjected to reading or correction may be appropriately determined, as a matter of course.

In each of the above-mentioned embodiments of the present invention, when at least a density check pattern such as a test pattern is to be printed, if one pixel is constituted by a plurality of dots, a printing duty, i.e., a printing density can be set by changing the number of recording dots in the number of constituting dots. A printing duty in this case is preferably set to be not more than 75% and not less than 25% in place of 100%, and more preferably, a test pattern is formed at a printing duty of 50%. This method is suitable for a system for optically obtaining a reflection density, and a small change in density can be obtained as one suitable for printing characteristics of a recording head.

Alternatively, the printing duty may be set by changing a drive voltage and/or a drive pulse width, or by changing the number of times of ink injections per dot. These operations can cope with a case wherein one pixel is constituted by one dot. The present invention is applicable even when the printing duty is set by changing any parameters.

Each of the embodiments of the present invention is an optimal embodiment wherein correction processing is performed in units of discharging energy generation elements. In practice, a plurality of predetermined adjacent discharging energy generation elements may be commonly corrected in consideration of a convergence state or a processing time of density uniforming processing. In an optimal arrangement from this point of view, a large number of discharging energy generation elements of a recording head are preferably commonly corrected in units of block driving groups each including a plurality of elements. The block driving method itself may be either a known method or a unique block driving method, and the block driving groups are corrected after density nonuniformity is discriminated according to the present invention. In this case, a driving condition capable of executing density uniforming processing must be provided.

Note that the present invention can be applied to image forming apparatuses based on various recording methods which may pose density nonuniformity problems (e.g., a thermal printer).

The present invention brings about excellent effects particularly in a recording head, recording device of the ink jet recording system utilizing heat energy among the ink jet recording system.

As to its representative constitution and principle, for example, one practiced by use of the basic principle disclosed in, for example, U.S. Pat. Nos. 4,723,129 and 4,740,796 is preferred. This system is applicable to either of the so called on-demand type and the continuous type. Particularly, the case of the on-demand type is effective because, by applying at least one driving signal which gives rapid temperature elevation exceeding nucleate boiling (i.e. to a film boiling temperature) corresponding to the recording information on an electricity-heat convertors arranged corresponding to the sheets or liquid channels holding liquid (ink), heat energy is generated at the electricity-heat convertors to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-heat converter (linear liquid channel or right angle liquid channel) as disclosed in the above-mentioned respective specifications, the constitution by use of U.S. Pat. No. 4,558,333 or 4,459,600 disclosing the constitution having the heat acting portion arranged in the flexed region is also included in the present invention. In addition, the present invention can be also effectively made the constitution as disclosed in Japanese Patent Laid-Open Application No. 59-123670 which discloses the constitution using a slit common to a plurality of electricity-heat converters as the discharging portion of the electricity-heat converter or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary auxiliary meas, etc. provided as the constitution of the recording device of the present invention is preferable, because the effect of the present invention can be further stabilized. Specific examples of these may include, for the recording head, capping means, cleaning means, pressurization or aspiration means, electricity-heat convertors or another heating element or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

Moreover, the ink-jet recording apparatus of the present invention may be an image output terminal for an information processing equipment such as a computer, a copying machine as a combination with, e.g., a reader, a facsimile apparatus having a transmission/reception function, or the like.

As described above, according to the present invention, the influence of light reflected by a background portion of a recording medium other than edge portions of a test pattern can be eliminated, and accurate density nonuniformity data can be obtained, thus allowing proper density nonuniformity correction.

Even when a test pattern is formed in a state wherein recording elements which cannot perform a normal recording operation are present, erroneous recognition of density nonuniformity caused by such recording elements can be prevented.

What is claimed is:

1. An image forming apparatus for recording data representing an original image read by a reading unit on a recording medium using a recording head having an array of a plurality of recording elements, the apparatus comprising:

mode select means for selecting a test mode for generating predetermined data in accordance with a first operation;

pattern forming means for forming a test pattern on said recording medium with said recording head using the predetermined data in accordance with a second operation, the test pattern having an area larger than an array range of said plurality of recording elements;

detection means for causing said reading unit to read the test pattern in accordance with a third operation to detect a density distribution within the array range of said plurality of recording elements;

generation means for generating correction data for correcting the data representing an original image based on the density distribution in correspondence with said plurality of recording elements; and guide means for instructing an operator of operational procedures of the apparatus by displaying on a display unit that each of the first, second and third operation is to be performed.

2. An apparatus according to claim 1, wherein said recording head is a scanning type recording head, and said pattern forming means scans said recording head a plurality of times to form a test pattern of a plurality of lines.

3. An apparatus according to claim 2, wherein said detection means extracts density data for one line from the plurality of lines of the test pattern, and detects the density distribution based on the extracted density data.

4. An apparatus according to claim 3, wherein said pattern forming means forms a test pattern of at least three lines.

5. An apparatus according to claim 1, wherein said detection means comprises non-printing portion detection means for detecting a non-printing portion based on the read test pattern, and said generation means does not use the density data of the non-printing portion detected by said non-printing portion detection means in generation of the correction data.

6. An apparatus according to claim 5, wherein said generation means replaces the density data of the non-printing portion detected by said non-printing portion detection means with adjacent density data, and uses the replaced data in generation of the correction data.

7. An apparatus according to claim 1, wherein said detection means comprises determination means for determining based on the read test pattern whether or not a positional relationship between said recording medium and said reading unit is proper.

8. An apparatus according to claim 7, wherein said guide means displays an alarm message on said display unit when said determination means determines that the positional relationship is not proper.

9. An apparatus according to claim 1, wherein said recording head has recording agents in different colors so as to perform multi-color recording.

10. An apparatus according to claim 1, wherein each of said recording elements of said recording head has a discharge orifice for discharging an ink.

11. An apparatus according to claim 10, wherein each of said recording elements of said recording head has thermal energy generation means, corresponding to said discharging orifice, for causing a change in state of an ink by heat, and causing the ink to be discharged from said discharging orifice as a result of the change in state so as to form a flying ink droplet.

12. An apparatus according to claim 11, wherein the change in state is film boiling.

13. An apparatus according to claim 1, wherein said guide means displays on the display unit that said mode select means, said pattern forming means and said detection means are being operated in accordance with said first, second and third operations, respectively.

14. An apparatus according to claim 1, wherein the test pattern has a duty of 25% to 75%.

15. An apparatus according to claim 1, wherein the test pattern has a duty of 50%.

16. An image forming apparatus for recording data representing an original image read by a reading unit on a recording medium using a recording head having an array of a plurality of recording elements, the apparatus comprising:
  mode select means for selecting a test mode for generating predetermined data in accordance with a first operation;
  pattern forming means for forming a test pattern on said recording medium with said recording head using the predetermined data in accordance with a second operation, the test pattern having an area larger than an array range of said plurality of recording elements;
  detection means for causing said reading unit to read the test pattern in accordance with a third operation to detect a density distribution within the array range of said plurality of recording elements; and
  guide means for instructing an operator of operational procedures of the apparatus by displaying on a display unit that each of the first, second and third operation is to be performed, and that said mode select means, said pattern forming means and said detection means are being operated in accordance with said first, second and third operations, respectively.

17. An image forming method of causing a reading unit to read an original placed on an original table and generate data representing the original, and causing a recording head having an array of a plurality of recording elements to record the data representing the original on a recording medium, the method comprising the steps of:
  displaying on a display unit that a first operation is to be performed to select a test mode for generating predetermined data representing a test pattern to be recorded on said recording medium;
  displaying on said display unit a message for urging an operator to perform a second operation for recording the test pattern when the first operation is performed;
  forming the test pattern on said recording medium using said recording head, the test pattern having an area larger than an array of said recording elements, when the second operation is performed;
  displaying on said display unit a message for urging the operator to perform a third operation of placing said recording medium having the test pattern thereon on said original table and reading the test pattern;
  causing said reading unit to read the test pattern to detect a density distribution within the array range of said plurality of recording elements when the third operation is performed;
  generating correction data for correcting the data representing an original based on the density distribution read by said reading unit; and
  displaying on said display unit that said generating step is being performed.

18. A method according to claim 13, wherein said recording head comprises a scanning type recording head, and said pattern forming step includes scanning said recording head a plurality of times so as to form a test pattern consisting of a plurality of lines.

19. A method according to claim 18, wherein said reading step includes extracting density data for one line from the plurality of lines of the test pattern, and detecting the density distribution based on the extracted density data.

20. A method according to claim 19, wherein said pattern forming step includes forming a test pattern of at least three lines.

21. A method according to claim 17, wherein said reading step includes detecting a non-printing portion based on the read test pattern, and said generation step includes not using the density data of the non-printing portion detected by said non-printing portion detection step in generation of the correction data.

22. A method according to claim 21, wherein said generation step includes replacing the density data of the non-printing portion detected by said non-printing portion detection step with adjacent density data, and using the replaced data in generation of the correction data.

23. A method according to claim 17, wherein said reading step includes determining based on the read test pattern whether or not a positional relationship of said recording medium placed on said original table is proper.

24. A method according to claim 23, wherein said reading step includes displaying an alarm message on said display unit when it is determined in said determination step that the positional relationship is not proper.

25. A method according to claim 17, wherein said recording head has recording agents in different colors so as to perform multi-color recording.

26. A method according to claim 17, wherein each of said recording elements of said recording head has a discharging orifice for discharging an ink.

27. A method according to claim 26, wherein each of said recording elements of said recording head has thermal energy generation means, corresponding to said discharging orifice, for causing a change in state of an ink by heat, and causing the ink to be discharged from said discharging orifice as a result of the change in state so as to form a flying ink droplet.

28. A method according to claim 27, wherein the change in state is film boiling.

29. A method according to claim 17, wherein the test pattern has a duty of 25% to 75%.

30. A method according to claim 17, wherein the test pattern has a duty of 50%.

31. An image forming method of causing a reading unit to read an original placed on an original table and generate data representing the original, and causing a recording head having an array of a plurality of recording elements to record the data representing the original on a recording medium, the method comprising the steps of:

displaying on a display unit that a first operation is to be performed to select a test mode for generating predetermined data representing a test pattern to be recorded on said recording medium;

displaying on said display unit a message for urging an operator to perform a second operation for recording the test pattern when the first operation is performed;

forming the test pattern on said recording medium using said recording head, the test pattern having an area larger than an array range of said recording elements, when the second operation is performed;

displaying on said display unit that said forming step is being performed;

displaying on said display unit a message for urging the operator to perform a third operation of placing said recording medium having the test pattern thereon on said original table and reading the test pattern;

causing said reading unit to read the test pattern to detect a density distribution within the array range of said plurality of recording elements when the third operation is performed; and displaying on said display unit that said reading step is being performed.

* * * * *

UNITED STATES PATENT AND TRADEMARK OFFICE
CERTIFICATE OF CORRECTION

PATENT NO. : 5,189,521

DATED : February 23, 1993

INVENTOR(S) : TOSHIHIKO OHTSUBO, ET AL.   Page 1 of 2

It is certified that error appears in the above-identified patent and that said Letters Patent is hereby corrected as shown below:

On title page, item [54] and col. 1, line 2

"CORRECTION" should read --CORRECTING--.

IN [57] ABSTRACT

Line 19, "display" should read --displaying--.

On drawing sheet 15 of 26

FIG. 15B, "OBTAN" should read --OBTAIN--.

COLUMN 1

Line 3, "CORRECTION" should read --CORRECTING--.

COLUMN 2

Line 49, "as" should read --an--.

COLUMN 5

Line 40, "the" (first occurrence) should be deleted.

COLUMN 12

Line 21, "control provides a" should read
--provides a control--.

COLUMN 19

Line 16, "orifices" should read --orifices.--.

UNITED STATES PATENT AND TRADEMARK OFFICE
CERTIFICATE OF CORRECTION

PATENT NO. : 5,189,521
DATED : February 23, 1993
INVENTOR(S) : TOSHIHIKO OHTSUBO, ET AL.

It is certified that error appears in the above-identified patent and that said Letters Patent is hereby corrected as shown below:

<u>COLUMN 23</u>

Line 60, "meas," should read --means,--.

<u>COLUMN 25</u>

Line 27, "discharge" should read --discharging--.

<u>COLUMN 26</u>

Line 21, "array" should read --array range--.
   Line 37, "claim 13," should read --claim 17,--.

Signed and Sealed this

Eighth Day of February, 1994

Attest:

BRUCE LEHMAN

*Attesting Officer*    *Commissioner of Patents and Trademarks*